United States Patent
Nakahara

(10) Patent No.: US 9,897,775 B2
(45) Date of Patent: Feb. 20, 2018

(54) OPTICAL SYSTEM AND IMAGING APPARATUS INCLUDING THE SAME

(71) Applicant: CANON KABUSHIKI KAISHA, Tokyo (JP)

(72) Inventor: Makoto Nakahara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/132,726

(22) Filed: Apr. 19, 2016

(65) Prior Publication Data

US 2016/0313535 A1  Oct. 27, 2016

(30) Foreign Application Priority Data

Apr. 24, 2015 (JP) ................. 2015-089582

(51) Int. Cl.
G02B 7/04 (2006.01)
G02B 7/105 (2006.01)
H04N 5/232 (2006.01)
H04N 5/369 (2011.01)
G02B 7/10 (2006.01)
G02B 13/04 (2006.01)

(52) U.S. Cl.
CPC ............ G02B 7/105 (2013.01); G02B 7/04 (2013.01); G02B 7/10 (2013.01); G02B 13/04 (2013.01); H04N 5/23212 (2013.01); H04N 5/23245 (2013.01); H04N 5/369 (2013.01)

(58) Field of Classification Search
CPC . G02B 7/105; G02B 7/04; G02B 7/10; G02B 13/04; H04N 5/23212; H04N 5/23245

USPC .................................................. 359/680, 676
See application file for complete search history.

(56) References Cited

U.S. PATENT DOCUMENTS

| | | | | |
|---|---|---|---|---|
| 5,075,709 A * | 12/1991 | Ueyama | ................. | G02B 7/102 396/78 |
| 5,227,832 A * | 7/1993 | Kawasaki | ............... | G02B 7/282 396/213 |
| 2003/0053220 A1* | 3/2003 | Sensui | ................... | G02B 13/20 359/692 |
| 2004/0051966 A1* | 3/2004 | Nurishi | .................. | G02B 7/102 359/698 |

(Continued)

FOREIGN PATENT DOCUMENTS

JP 2012-123340 A 6/2012

*Primary Examiner* — William R Alexander
(74) *Attorney, Agent, or Firm* — Canon USA Inc., IP Division

(57) ABSTRACT

An optical system includes a focusing lens unit configured to move in a first focusing mode intended for focusing within a range of object distances from infinity to a first finite distance and in a second focusing mode intended for focusing within a range of object distances from a second finite distance that is shorter than infinity to a third finite distance that is shorter than the first finite distance, and a mode-changing unit configured to move when the focusing mode is changed between the first focusing mode and the second focusing mode. In the optical system, lateral magnification $\beta f$ of the focusing lens unit when focusing on a point at infinity, and lateral magnification $\beta r$ of a combination of any lenses that are on an image side with respect to the focusing lens unit when focusing on the point at infinity are set appropriately.

14 Claims, 13 Drawing Sheets

(56) References Cited

U.S. PATENT DOCUMENTS

| | | | |
|---|---|---|---|
| 2005/0046966 A1* | 3/2005 | Okawara | G02B 7/102 |
| | | | 359/696 |
| 2010/0002128 A1* | 1/2010 | Ishii | G03B 3/00 |
| | | | 348/349 |
| 2012/0002274 A1* | 1/2012 | Knoblich | G02B 21/24 |
| | | | 359/380 |
| 2013/0010137 A1* | 1/2013 | Kawai | H04N 5/23258 |
| | | | 348/208.1 |

\* cited by examiner

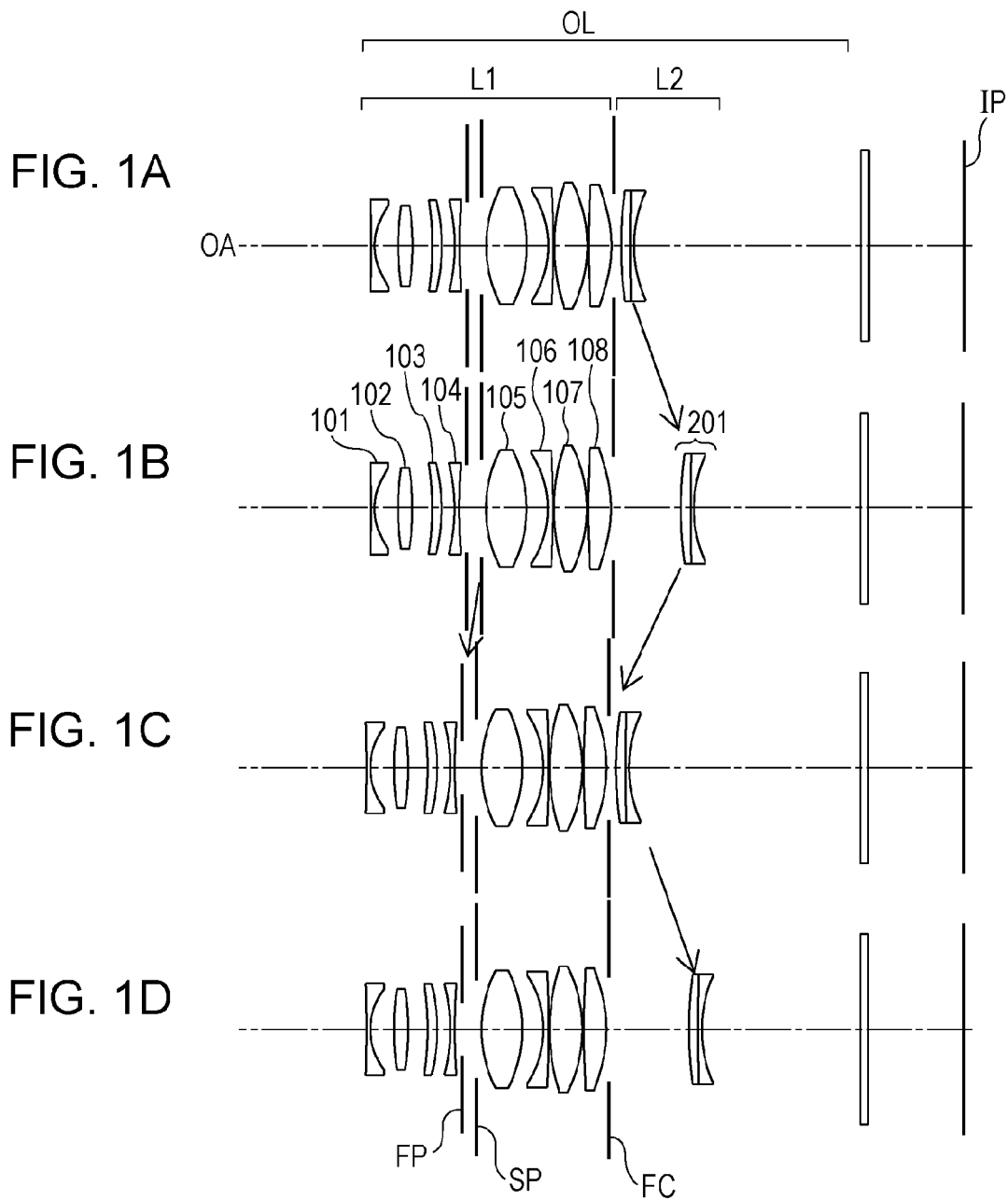

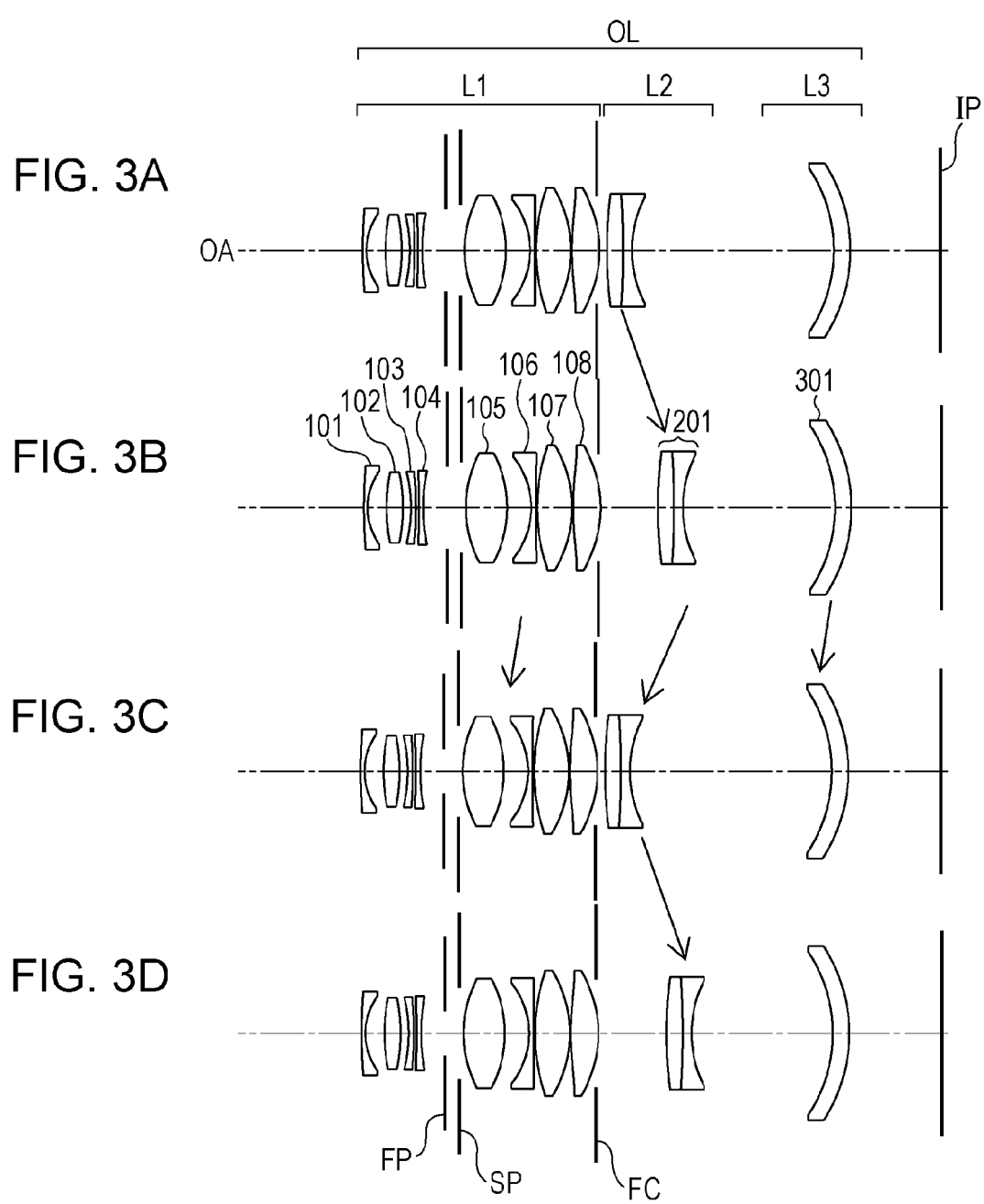

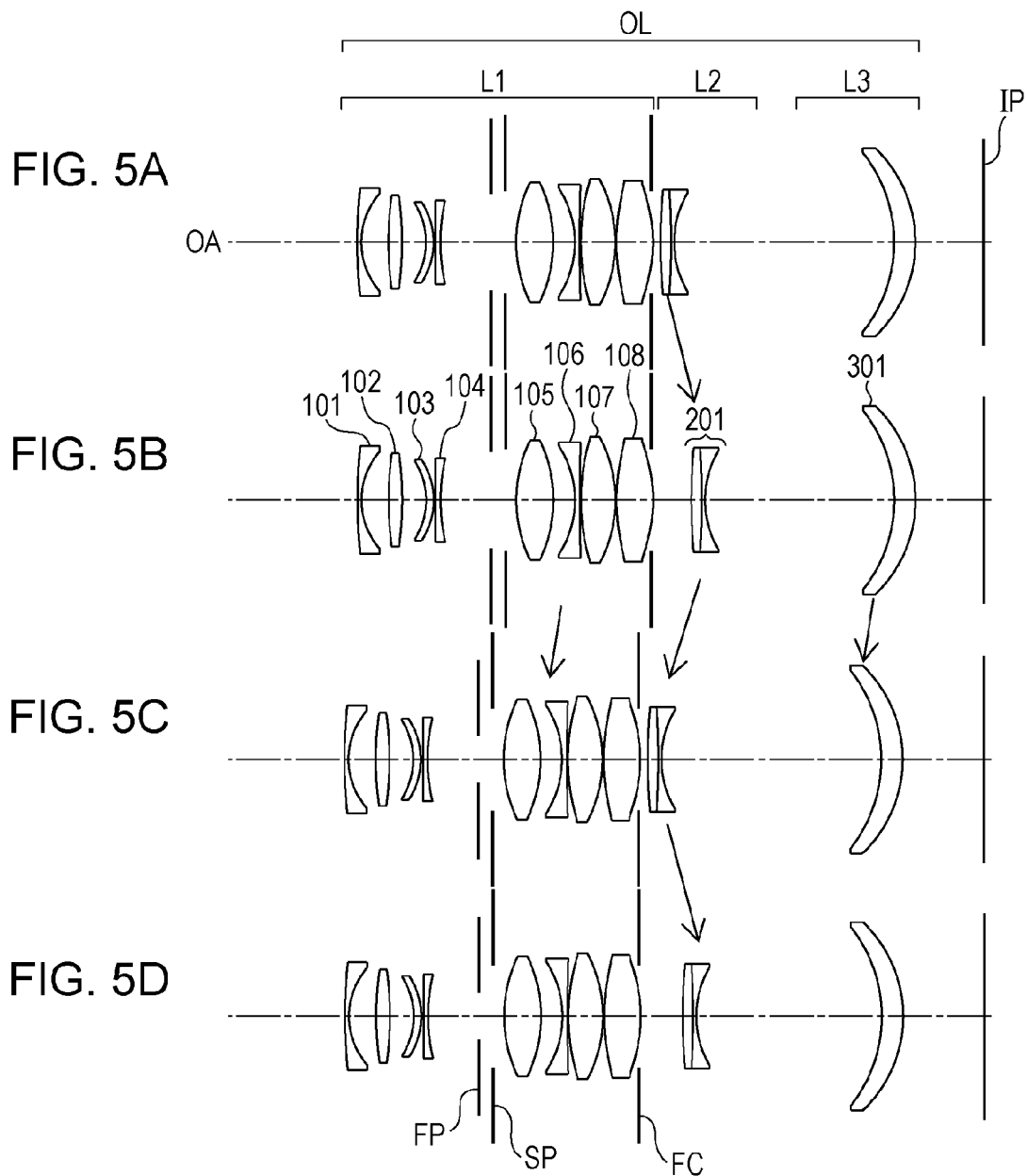

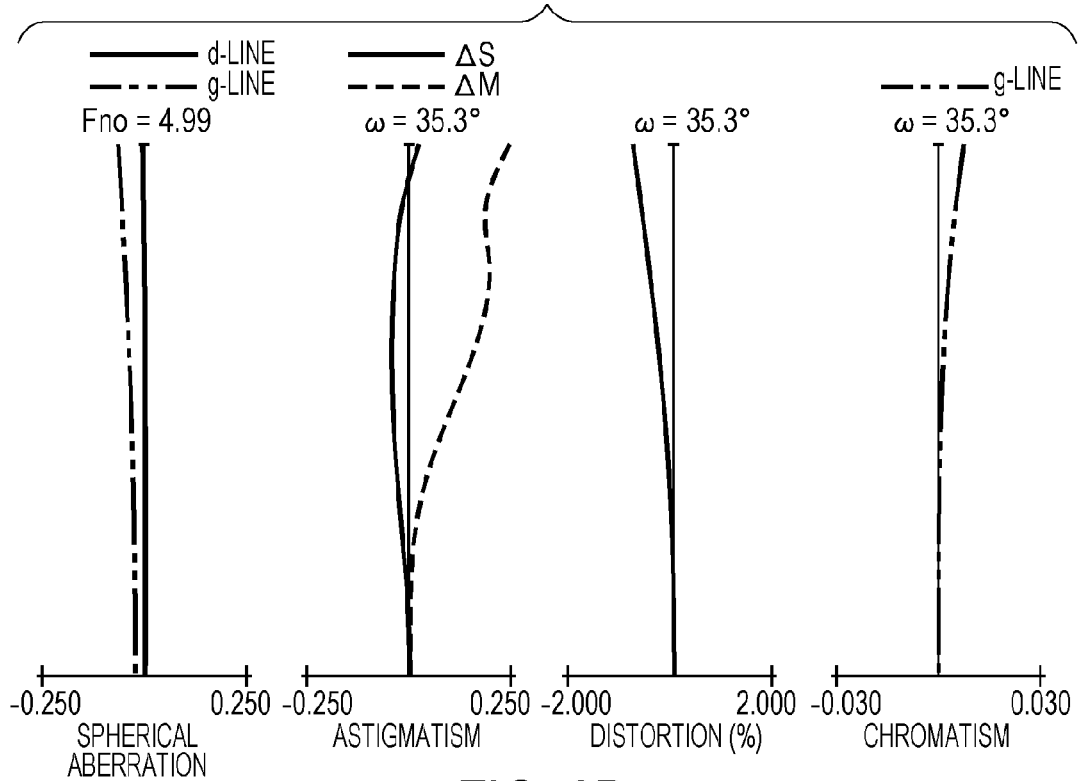
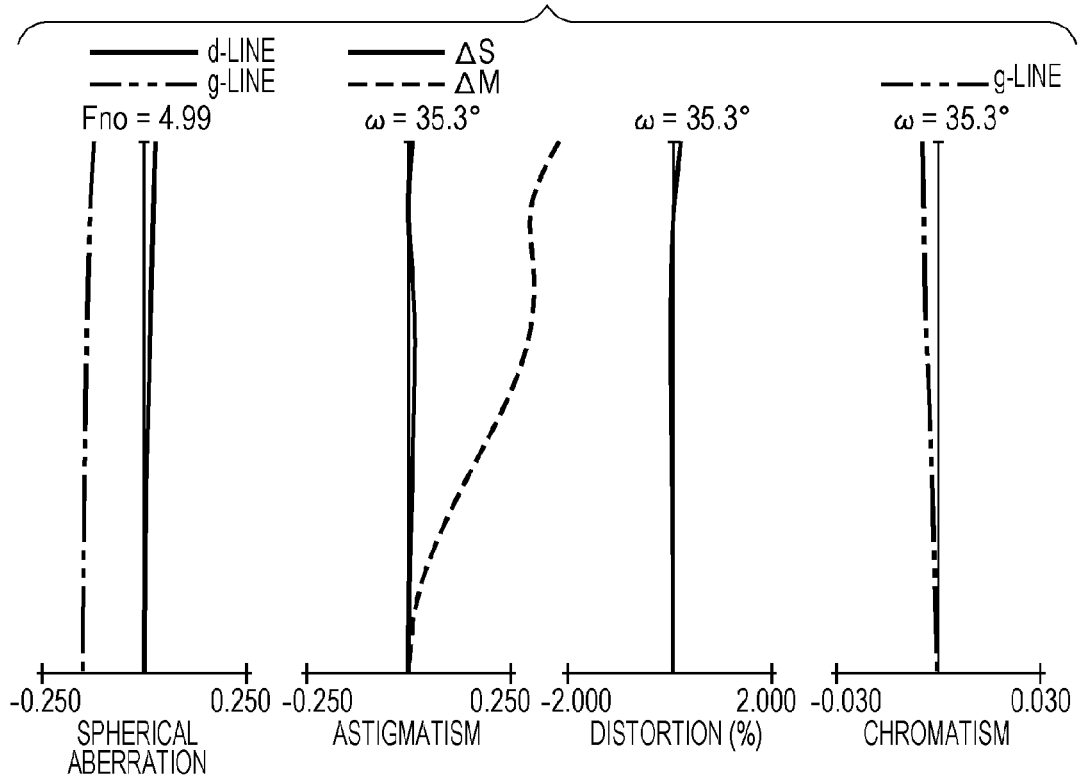

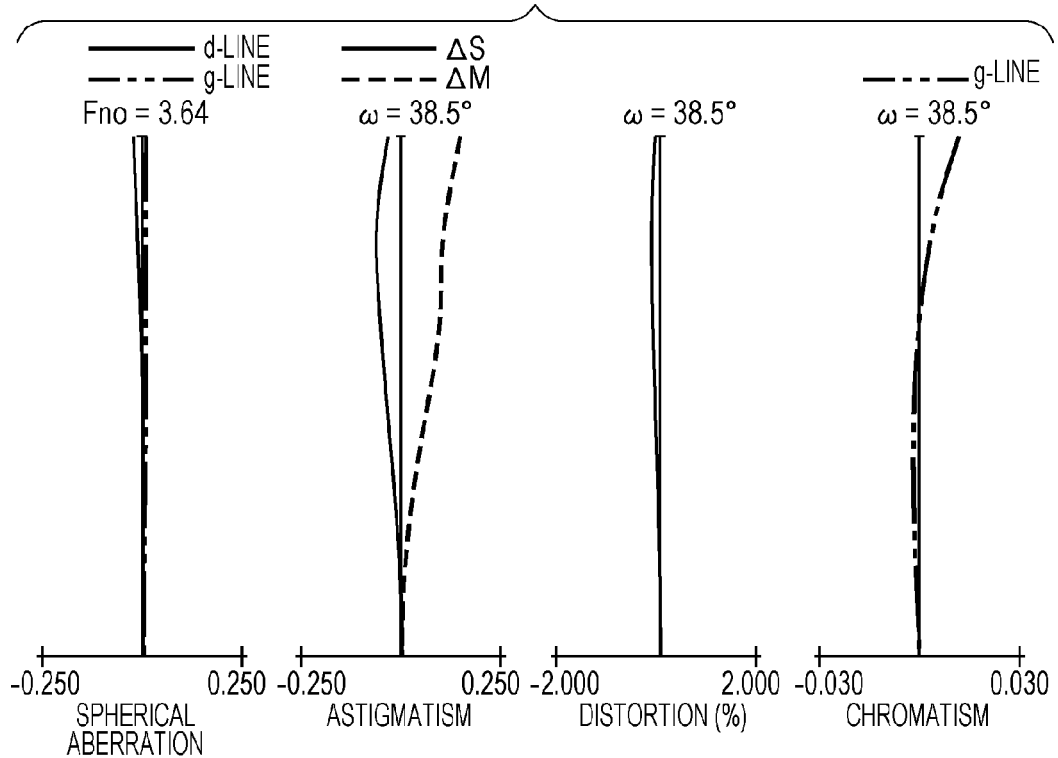
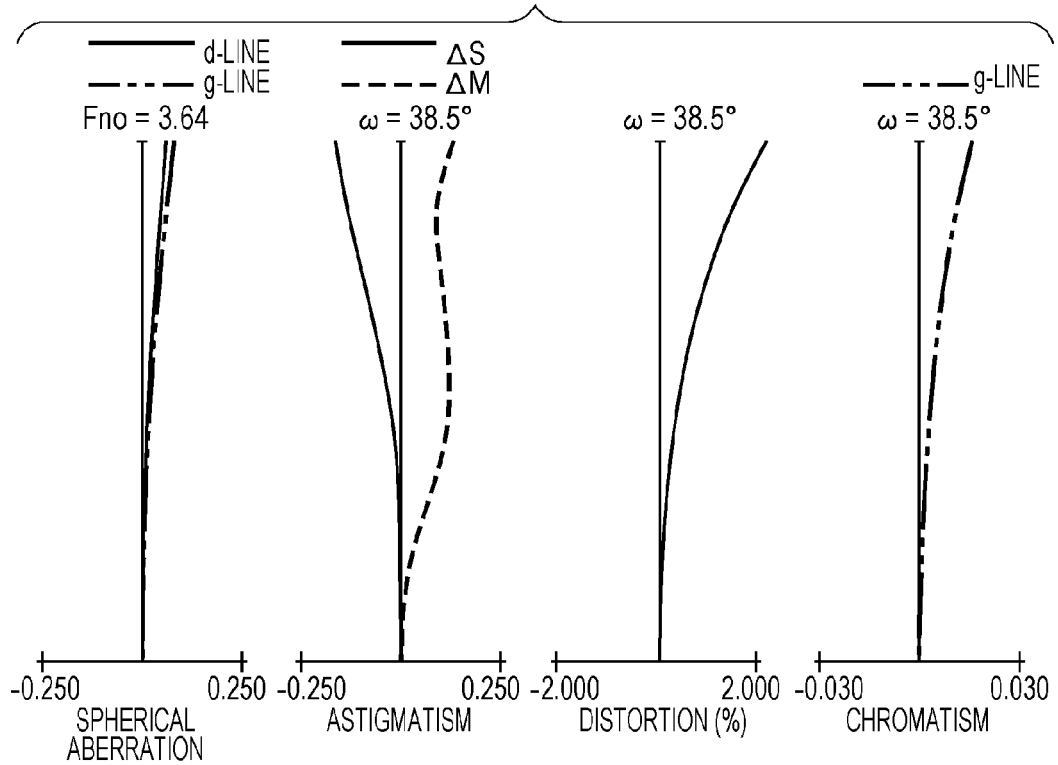

OPTICAL SYSTEM AND IMAGING APPARATUS INCLUDING THE SAME

BACKGROUND OF THE INVENTION

Field of the Invention

The present invention relates to an optical system and an imaging apparatus including the same. The optical system is suitable for imaging apparatuses, such as a digital still camera, a video camera, a security camera, and a broadcast camera, including imaging devices; and imaging apparatuses such as a silver-halide camera.

Description of the Related Art

Known focusing methods widely employed in imaging lens systems include an inner focus method and a rear focus method in each of which a lens provided at a position on the image side with respect to a lens provided at the extreme end on the object side is moved for focusing.

Herein, a focusing method in which a lens provided on the image side with respect to an aperture stop is moved for focusing is referred to as the "rear focus method", and a focusing method in which a lens provided on the object side with respect to the aperture stop is moved for focusing is referred to as the "inner focus method".

In an imaging lens system employing the inner focus method or the rear focus method, since a relatively small lens is moved for focusing, a quick focusing action is realized.

On the other hand, a macro lens system is known as an imaging lens system intended mainly for short-range imaging with a substantially 1× magnification. An optical system forming the macro lens system is desired to exhibit high optical performance in short-range imaging.

In an imaging lens system disclosed by Japanese Patent Application Laid-Open No. 2012-123340, a plurality of modes are switched there among for different ranges of object distances. The imaging lens system disclosed by Japanese Patent Application Laid-Open No. 2012-123340 is operable in a first mode intended for focusing within a range of object distances from infinity to a first short distance, and in a second mode intended for focusing within a range of object distances from a second short distance that is shorter than infinity to a third short distance that is shorter than the first short distance. In this imaging lens system, the first mode and the second mode are used selectively, whereby the range of object distances that are usable for focusing is widened.

When the mode of the imaging lens system is changed from the first mode to the second mode, the entirety of the imaging lens system is moved toward the object side, whereby the length of the imaging lens system as a whole in the first mode is reduced.

In the optical system disclosed by Japanese Patent Application Laid-Open No. 2012-123340, since the lateral magnification of a focusing lens unit is low, focus sensitivity is too low. Such a configuration increases the length of travel of the focusing lens unit during focusing, leading to a possible increase in the size of the optical system as a whole.

SUMMARY OF THE INVENTION

According to an aspect of the present invention, an optical system includes a focusing lens unit configured to move in a first focusing mode intended for focusing within a range of object distances from infinity to a first finite distance and in a second focusing mode intended for focusing within a range of object distances from a second finite distance that is shorter than infinity to a third finite distance that is shorter than the first finite distance, and a mode-changing unit configured to move when the focusing mode is changed between the first focusing mode and the second focusing mode. In the optical system, the following conditional expression is satisfied:

$$2.20 < |1 - \beta f^2| \times \beta r^2 < 9.00$$

where $\beta f$ denotes lateral magnification of the focusing lens unit when focusing on a point at infinity, and $\beta r$ denotes lateral magnification of a combination of any lenses that are on an image side with respect to the focusing lens unit when focusing on the point at infinity.

Further features of the present invention will become apparent from the following description of exemplary embodiments with reference to the attached drawings.

BRIEF DESCRIPTION OF THE DRAWINGS

FIGS. 1A to 1D are sectional views of an optical system according to a first embodiment of the present invention.

FIGS. 3A to 3D are sectional views of an optical system according to a second embodiment of the present invention.

FIGS. 5A to 5D are sectional views of an optical system according to a third embodiment of the present invention.

FIGS. 6A to 6D are diagrams illustrating aberrations of the optical system according to the third embodiment.

FIGS. 8A to 8D are diagrams illustrating aberrations of the optical system according to the fourth embodiment.

DESCRIPTION OF THE EMBODIMENTS

Embodiments of the optical system and an imaging apparatus including the optical system according to the present invention will now be described in detail with reference to the attached drawings. An optical system according to a general embodiment of the present invention includes a plurality of lens units. The distance between consecutive ones of the lens units changes when focusing is performed. The term "lens unit" refers to a unit of separate lens elements (the lens elements are each hereinafter referred to as a "lens") that are provided on an optical axis and at intervals that are changed when focusing is performed. Each lens unit only needs to include at least one lens and does not necessarily include a plurality of lenses. The optical system according to the general embodiment of the present invention further includes a mode-changing unit that is moved when the focusing mode is changed.

The optical system according to the general embodiment of the present invention has at least a first focusing mode and a second focusing mode. The first focusing mode is intended for focusing within a range of object distances from infinity to a first finite distance. The second focusing mode is intended for focusing within a range of object distances from a second finite distance that is shorter than infinity to a third finite distance that is shorter than the first finite distance. The changing of the focusing mode will be described later.

Figure 2A:
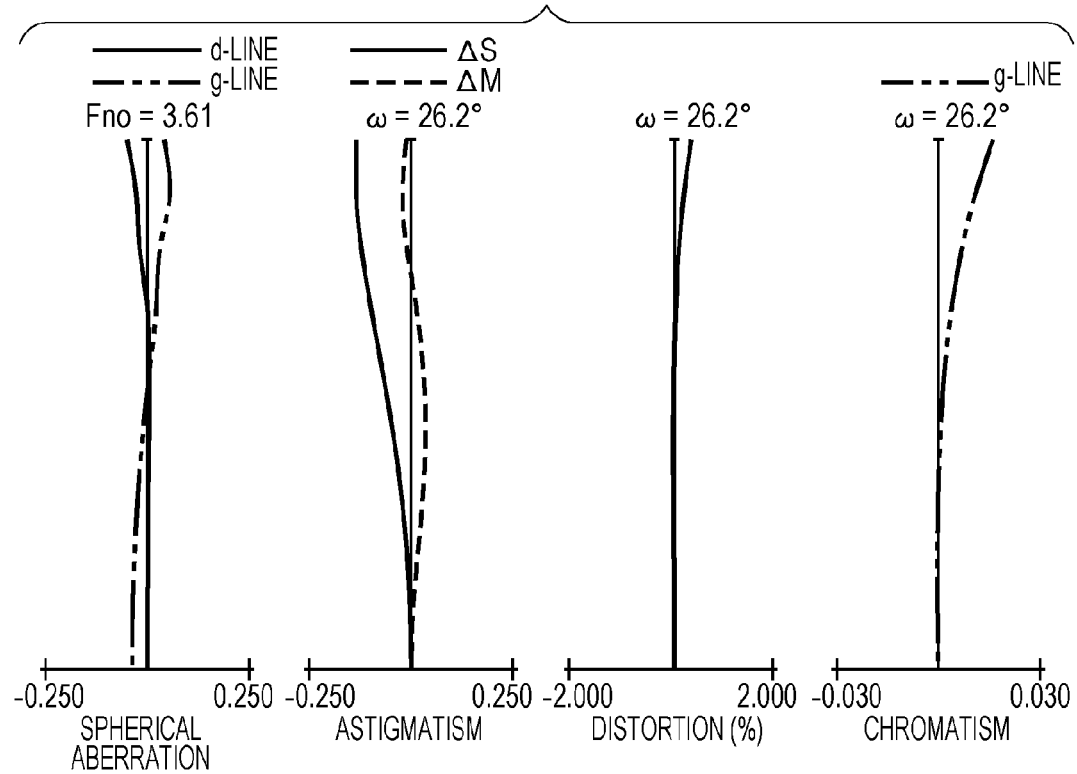
FIGS. 2A to 2D are diagrams illustrating aberrations of the optical system according to the first embodiment.
Figure 2B:
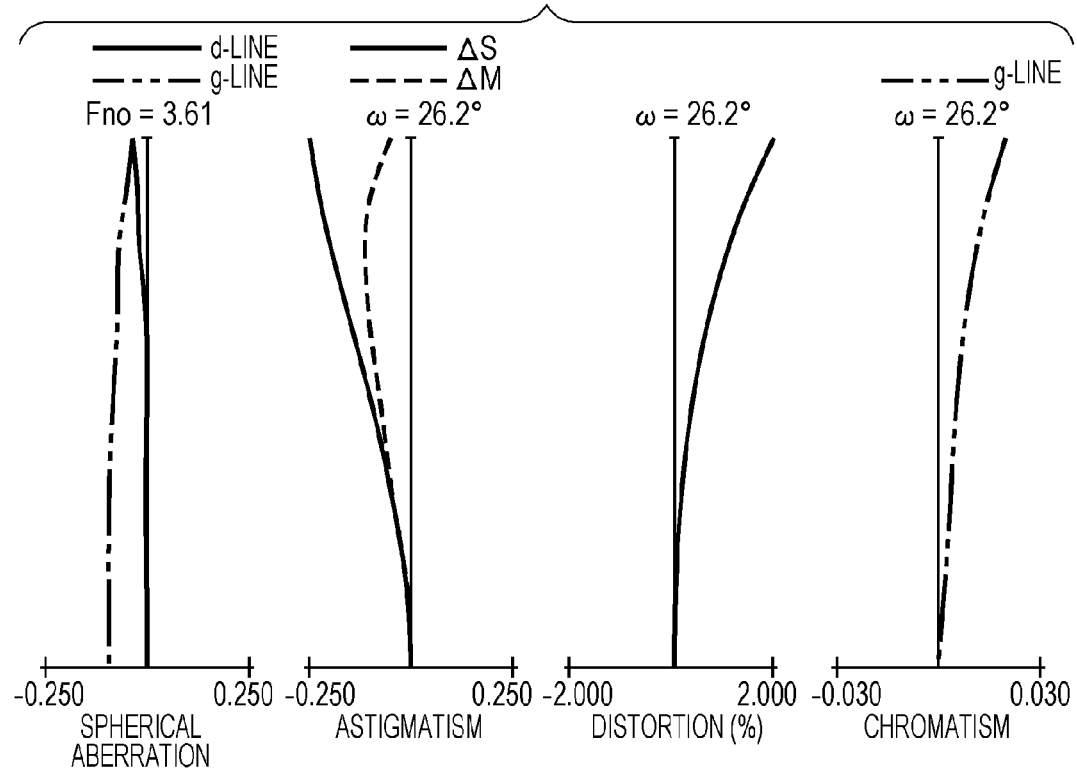
Figure 2C:
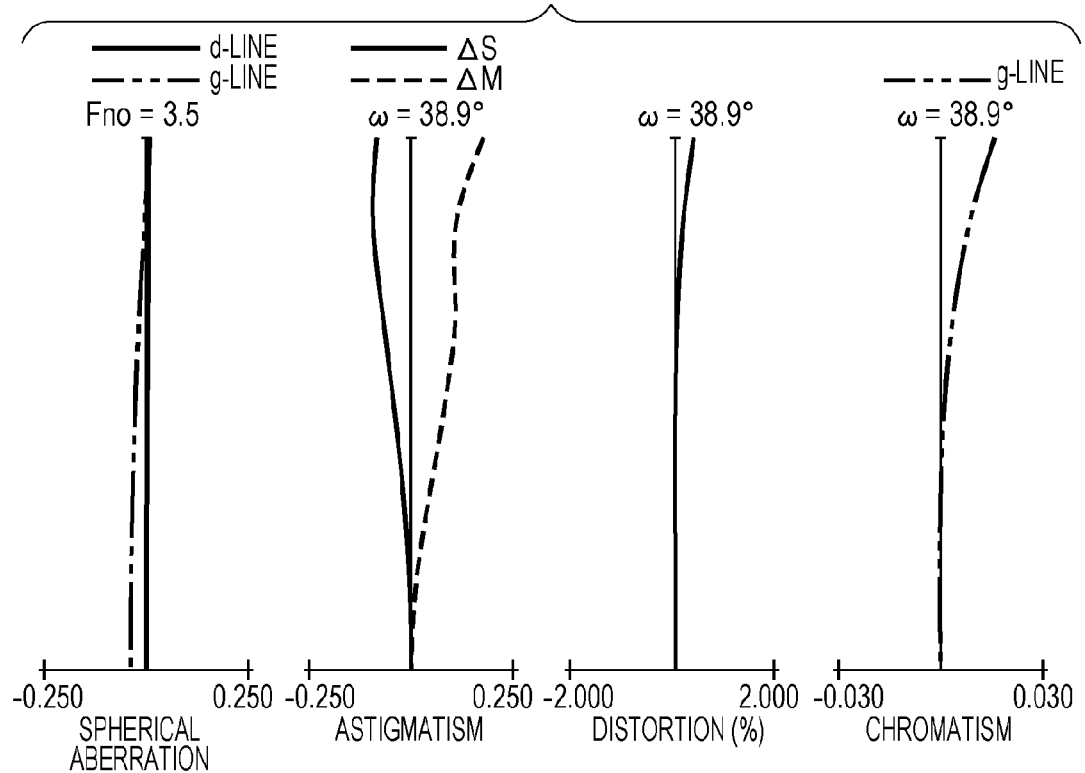
Figure 2D:
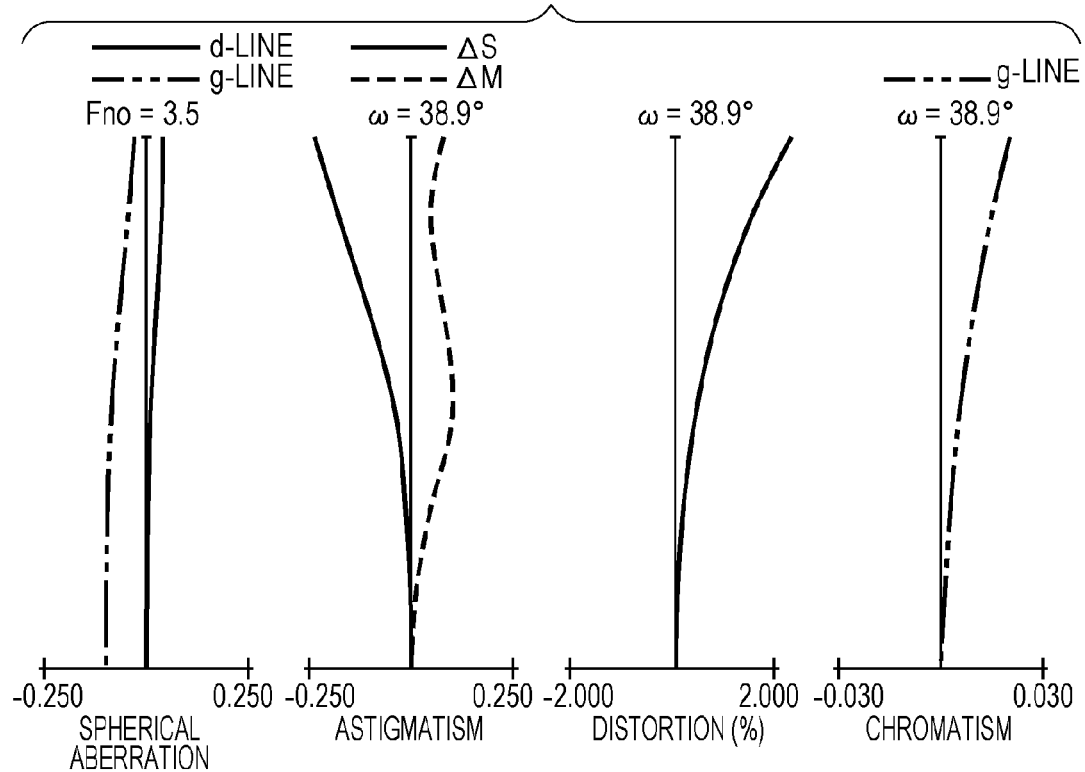

FIGS. 1A and 1B are sectional views of an optical system OL that is in the first focusing mode and is focused on a point at infinity and on a point at a first finite distance, respectively, according to a first embodiment of the present invention. FIGS. 1C and 1D are sectional views of the optical system OL that is in the second focusing mode and is focused on a point at a second finite distance and on a point at a third finite distance, respectively, according to the first embodiment. FIGS. 2A and 2B are diagrams illustrating aberrations of the optical system OL that is in the first focusing mode and is focused on the point at infinity and on the point at the first finite distance, respectively, according to the first embodiment. FIGS. 2C and 2D are diagrams illustrating aberrations of the optical system OL that is in the second focusing mode and is focused on the point at the second finite distance and on the point at the third finite distance, respectively, according to the first embodiment. The first finite distance is an object distance where image magnification is 1.00×. The second finite distance is an object distance where image magnification is 0.02×. The third finite distance is an object distance where image magnification is 1.20×. The foregoing magnification values of the first finite distance, the second finite distance, and the third finite distance are only exemplary. The second finite distance only needs to be shorter than infinity. The third finite distance only needs to be shorter than the first finite distance. These facts also apply to second to fourth embodiments to be described later.

Figure 4A:
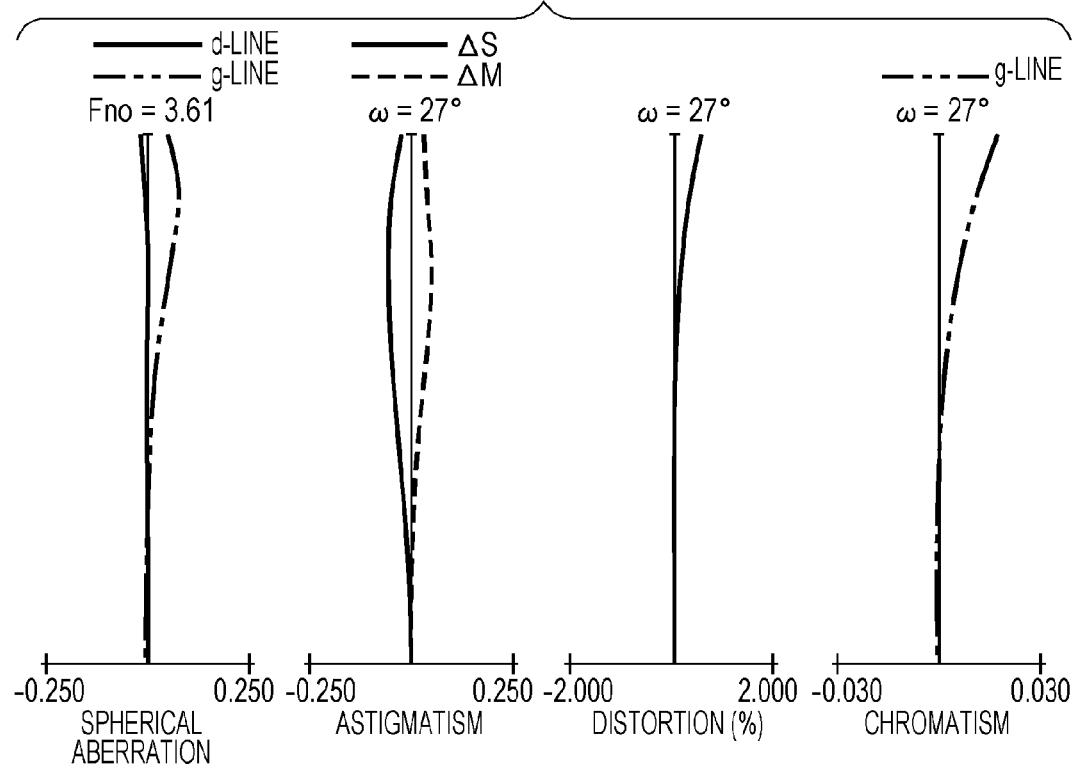
FIGS. 4A to 4D are diagrams illustrating aberrations of the optical system according to the second embodiment.
Figure 4B:
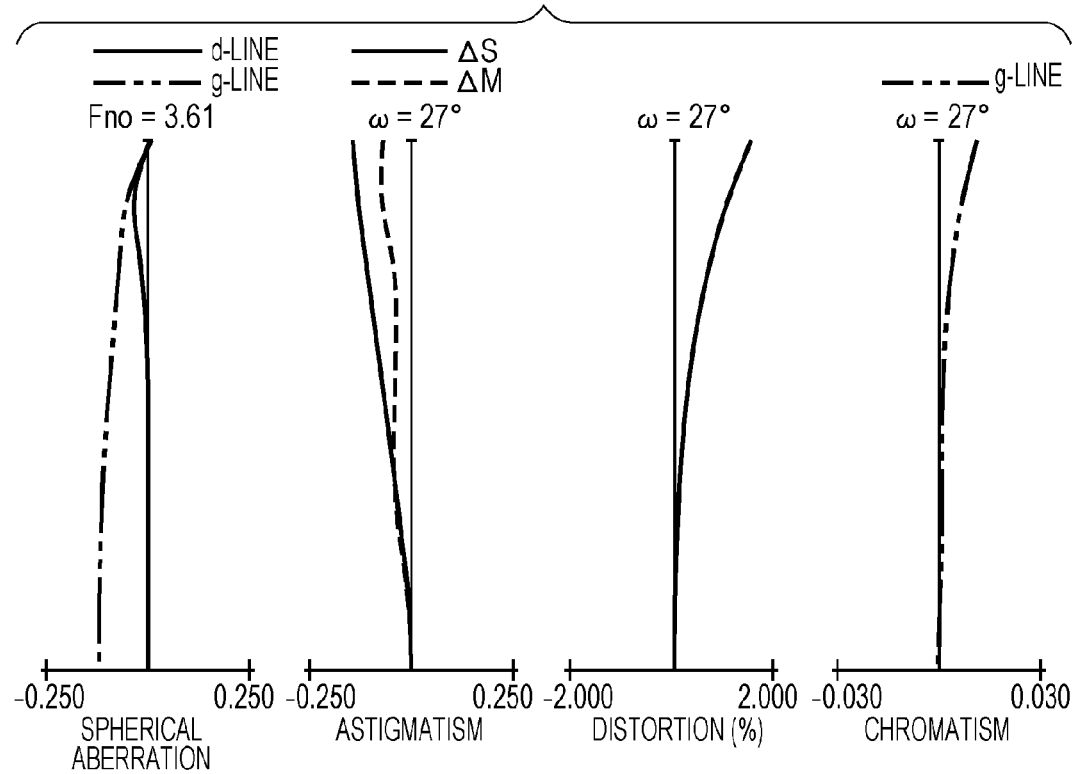
Figure 4C:
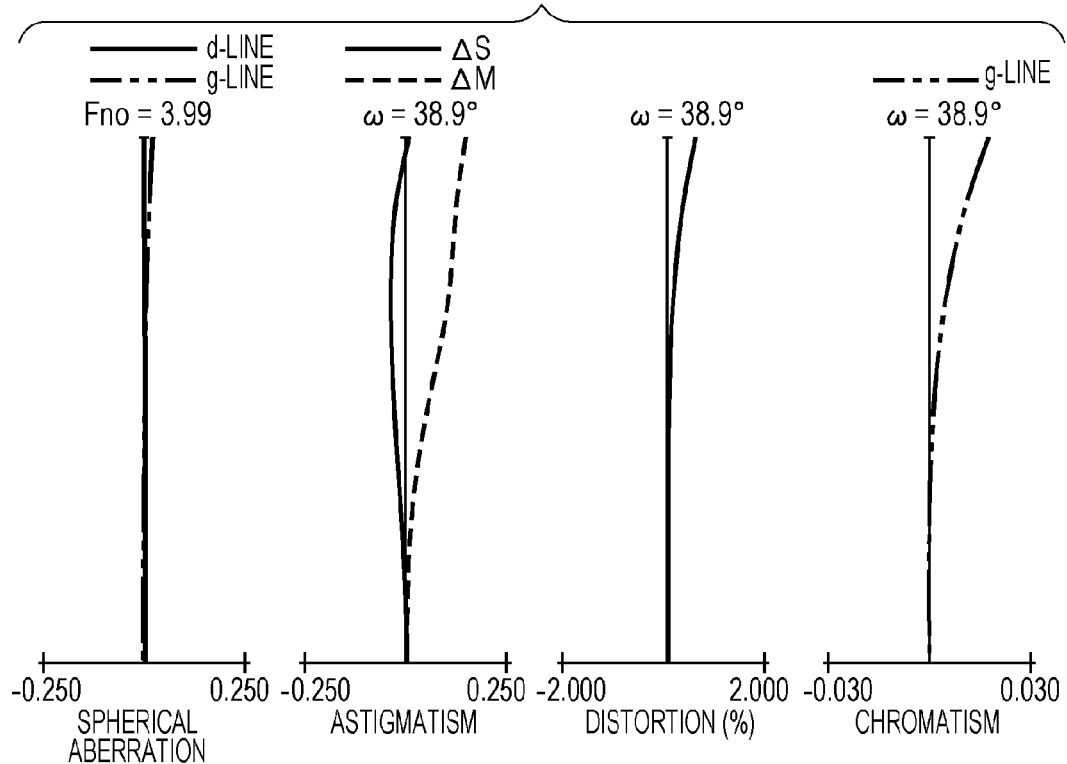
Figure 4D:
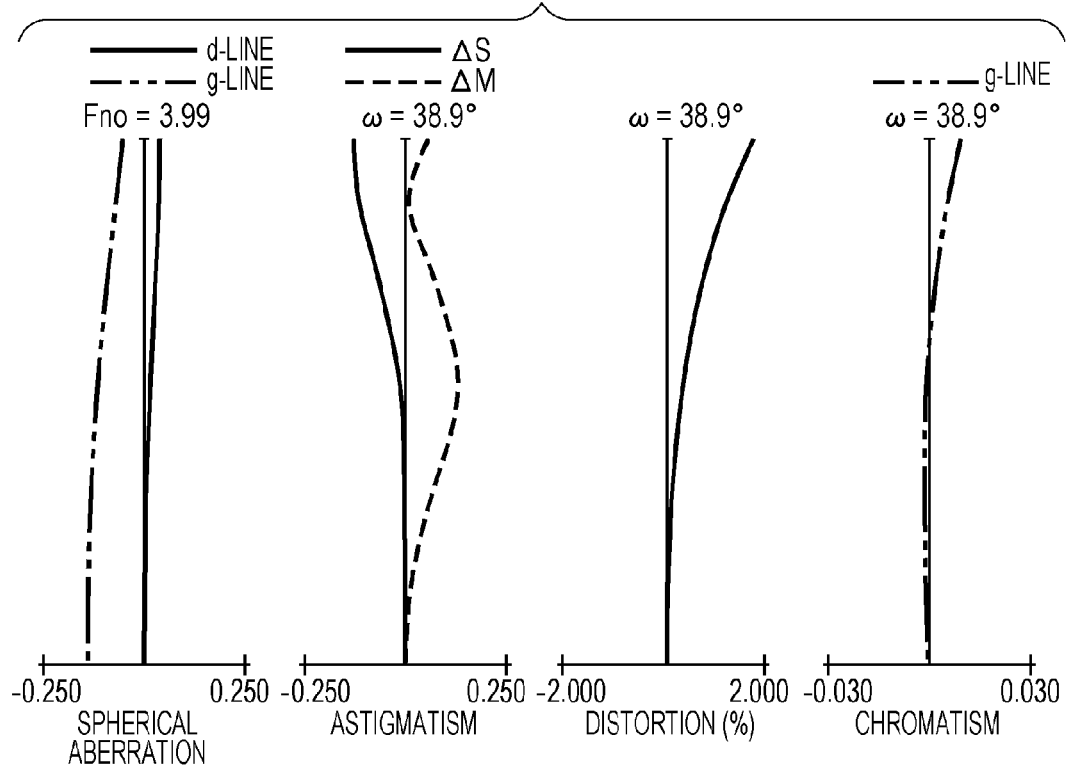

FIGS. 3A and 3B are sectional views of an optical system OL that is in the first focusing mode and is focused on a point at infinity and on a point at a first finite distance, respectively, according to a second embodiment of the present invention. FIGS. 3C and 3D are sectional views of the optical system OL that is in the second focusing mode and is focused on a point at a second finite distance and on a point at a third finite distance, respectively, according to the second embodiment. FIGS. 4A and 4B are diagrams illustrating aberrations of the optical system OL that is in the first focusing mode and is focused on the point at infinity and on the point at the first finite distance, respectively, according to the second embodiment. FIGS. 4C and 4D are diagrams illustrating aberrations of the optical system OL that is in the second focusing mode and is focused on the point at the second finite distance and on the point at the third finite distance, respectively, according to the second embodiment. The first finite distance is an object distance where image magnification is 1.00×. The second finite distance is an object distance where image magnification is 0.01×. The third finite distance is an object distance where image magnification is 1.20×.

Figure 6A:
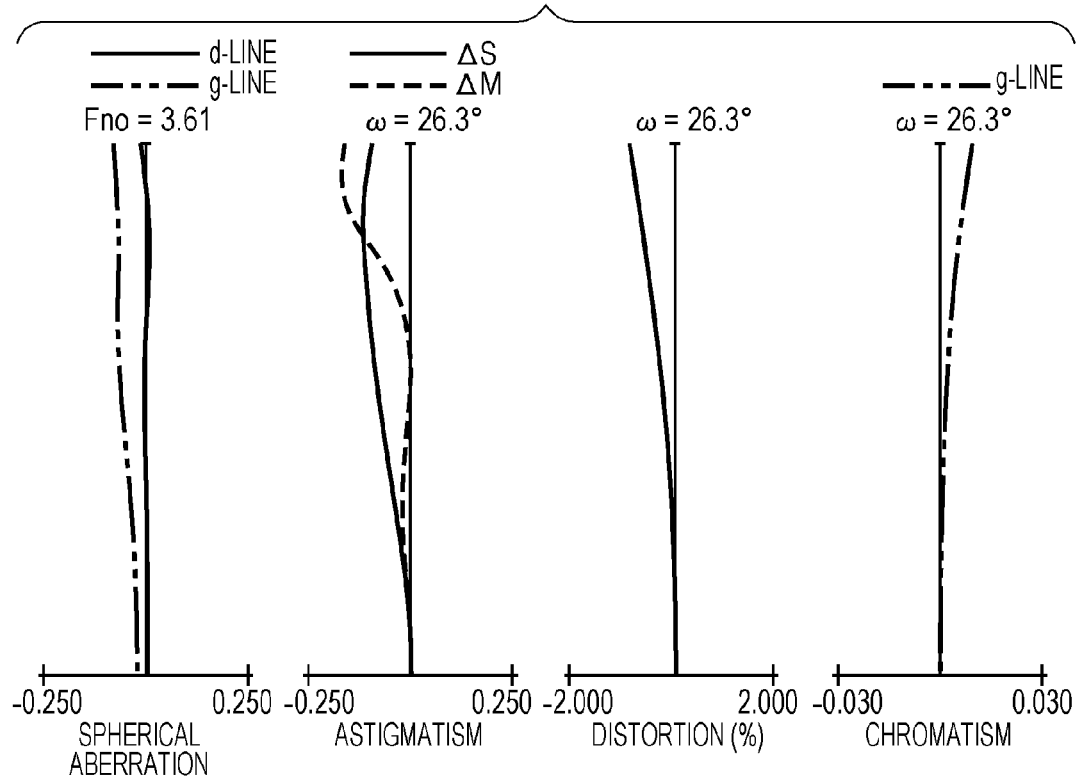
Figure 6B:
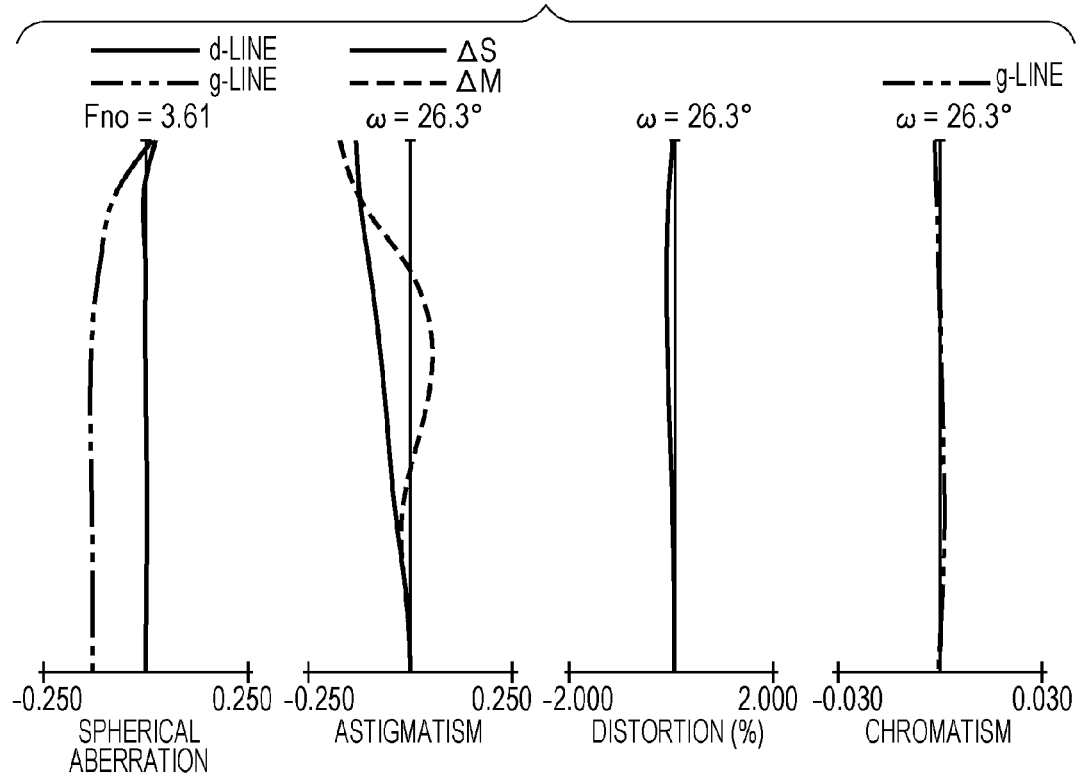

FIGS. 5A and 5B are sectional views of an optical system OL that is in the first focusing mode and is focused on a point at infinity and on a point at a first finite distance, respectively, according to a third embodiment of the present invention. FIGS. 5C and 5D are sectional views of the optical system OL that is in the second focusing mode and is focused on a point at a second finite distance and on a point at a third finite distance, respectively, according to the third embodiment. FIGS. 6A and 6B are diagrams illustrating aberrations of the optical system OL that is in the first focusing mode and is focused on the point at infinity and on the point at the first finite distance, respectively, according to the third embodiment. FIGS. 6C and 6D are diagrams illustrating aberrations of the optical system OL that is in the second focusing mode and is focused on the point at the second finite distance and on the point at the third finite distance, respectively, according to the third embodiment. The first finite distance is an object distance where image magnification is 1.00×. The second finite distance is an object distance where image magnification is 0.06×. The third finite distance is an object distance where image magnification is 1.20×.

Figure 7A:
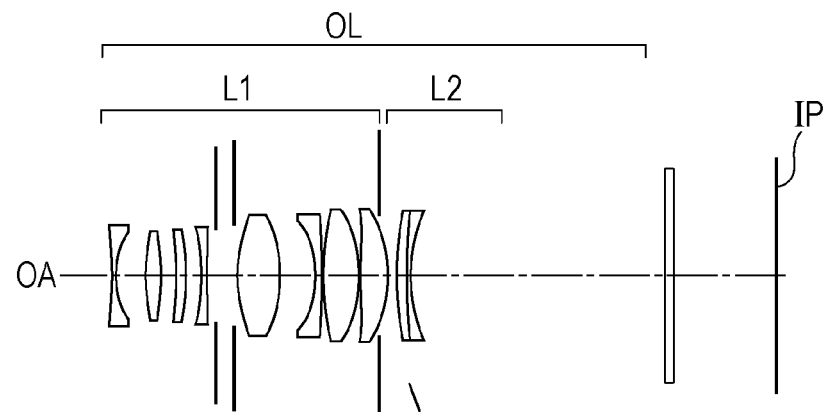
FIGS. 7A to 7D are sectional views of an optical system according to a fourth embodiment of the present invention.
Figure 7B:
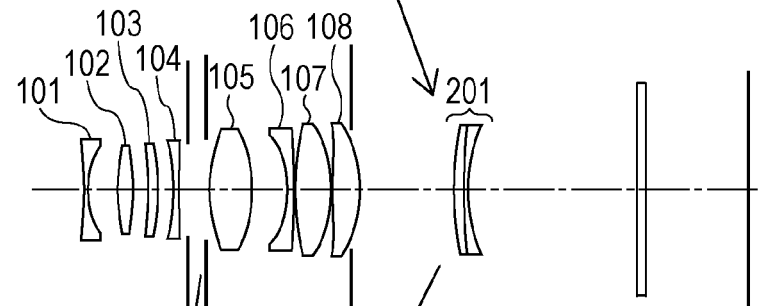
Figure 7C:
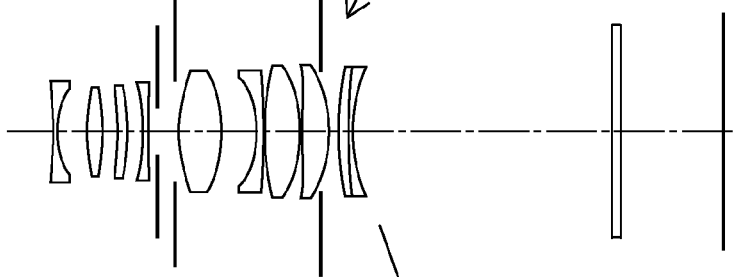
Figure 7D:
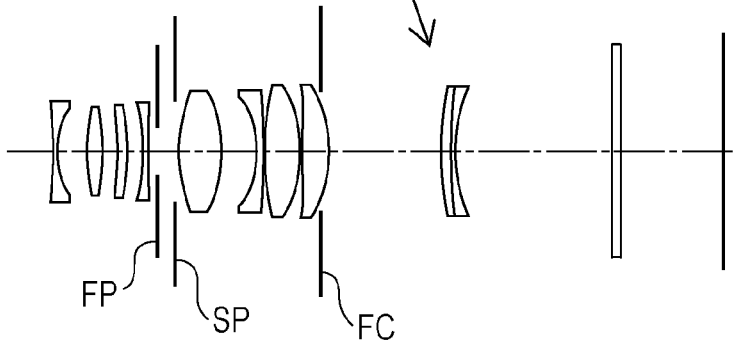
Figure 8A:
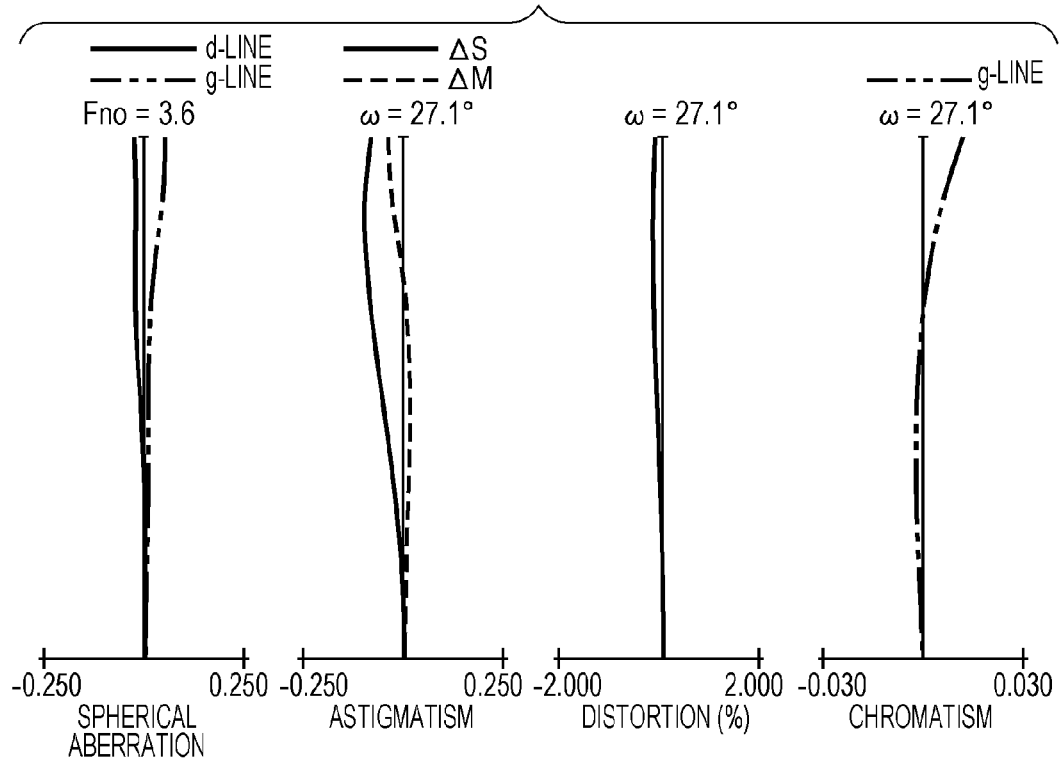
Figure 8B:
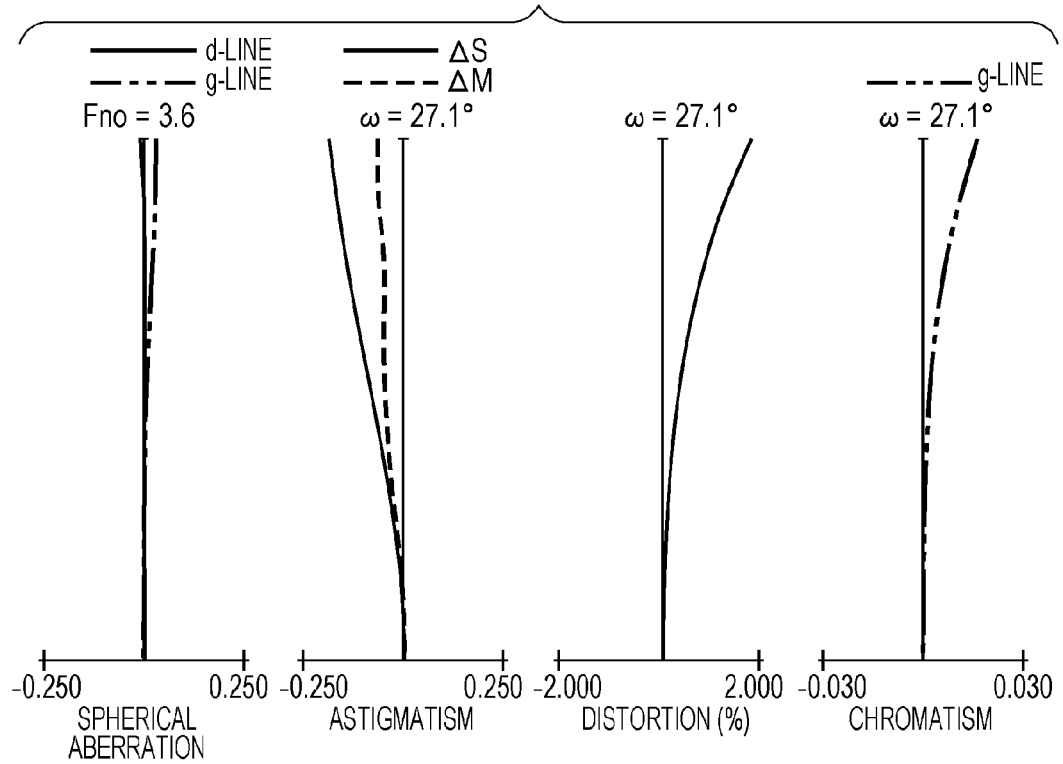

FIGS. 7A and 7B are sectional views of an optical system OL that is in the first focusing mode and is focused on a point at infinity and on a point at a first finite distance, respectively, according to a fourth embodiment of the present invention. FIGS. 7C and 7D are sectional views of the optical system OL that is in the second focusing mode and is focused on a point at a second finite distance and on a point at a third finite distance, respectively, according to the fourth embodiment. FIGS. 8A and 8B are diagrams illustrating aberrations of the optical system OL that is in the first focusing mode and is focused on the point at infinity and on the point at the first finite distance, respectively, according to the fourth embodiment. FIGS. 8C and 8D are diagrams illustrating aberrations of the optical system OL that is in the second focusing mode and is focused on the point at the second finite distance and on the point at the third finite distance, respectively, according to the fourth embodiment. The first finite distance is an object distance where image magnification is 1.00×. The second finite distance is an object distance where image magnification is 0.02×. The third finite distance is an object distance where image magnification is 1.20×.

Figure 9:
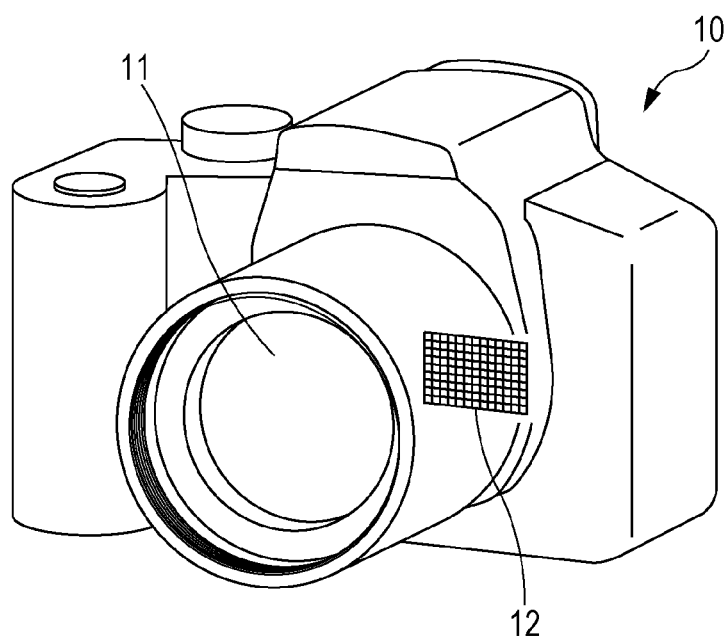
FIG. 9 schematically illustrates relevant parts of an imaging apparatus including any of the optical systems according to the first to fourth embodiments of the present invention.

FIG. 9 schematically illustrates relevant parts of an imaging apparatus including any of the optical systems OL according to the first to fourth embodiments of the present invention. The optical systems OL, according to the first to fourth embodiments, are each an imaging lens system intended for an imaging apparatus such as a video camera, a digital camera, a silver-halide camera, or a television camera. The left side of each of the sectional views of the optical systems OL is an object side (front side), and the right side is an image side (rear side). In each of the sectional views of the optical systems OL, Li denotes an i-th lens unit, where i denotes the ordinal number of each lens unit when the lens units are counted from the object side toward the image side.

The optical systems OL, according to the first and fourth embodiments, each consist of a first lens unit L1 having positive refractive power, and a second lens unit L2 having negative refractive power. The optical system OL, according to the second embodiment, consists of a first lens unit L1 having positive refractive power, a second lens unit L2 having negative refractive power, and a third lens unit L3 having negative refractive power. The optical system OL, according to the third embodiment, consists of a first lens unit L1 having positive refractive power, a second lens unit L2 having negative refractive power, and a third lens unit L3 having positive refractive power.

In each of the embodiments, an aperture stop SP is provided in the first lens unit L1, and a flare cutting stop FC having an aperture of a fixed diameter is provided between the first lens unit L1 and the second lens unit L2. The flare cutting stop FC reduces unwanted rays that cause ghost, flare, and the like. A supplementary stop FP having an aperture of a fixed diameter is provided in the first lens unit L1. The supplementary stop FP reduces coma flare that may be caused by marginal rays on the upper side of a screen.

If the optical system OL is used as an imaging optical system of a video camera or a digital camera, an image plane IP corresponds to a solid-state imaging device (photoelectric conversion device) such as a charge-coupled-device (CCD) sensor or a complementary-metal-oxide-semiconductor (CMOS) sensor. If the optical system OL is used as an imaging optical system of a silver-halide camera, the image plane IP corresponds to a film surface.

In each of the diagrams illustrating spherical aberration, Fno denotes the f-number, and spherical aberration is graphed for d-line (at a wavelength of 587.6 nm) and for g-line (at a wavelength of 435.8 nm). In each of the diagrams illustrating astigmatism, S denotes the sagittal image plane, and M denotes the meridional image plane. Distortion is graphed for d-line. Chromatism is graphed for g-line. A symbol ω denotes the half angle of view.

In each of the embodiments, when the focus is changed from a point at infinity to a point at the first finite distance and from a point at the second finite distance to a point at the third finite distance, the second lens unit L2 is moved as represented by arrows in the sectional views, whereby the distance between the second lens unit L2 and each lens unit L1 or L3 adjacent thereto changes. That is, the second lens unit L2 of the optical system OL according to each of the embodiments corresponds to the focusing lens unit.

The third finite distance is set to a shorter distance than the first finite distance. That is, the second focusing mode is intended for imaging of an object at a shorter distance than in the first focusing mode. The second finite distance is set to a shorter distance than infinity. The first finite distance and the second finite distance can be set such that the first finite distance becomes shorter than the second finite distance.

Since the focusing range for the first focusing mode and the focusing range for the second focusing mode overlap each other, the optical system OL as a whole can have a seamless focusing range that covers all of the object distances handleable.

When the mode is changed from the first focusing mode to the second focusing mode, the mode-changing unit is moved along an optical axis OA. Appropriately moving the focusing lens unit and the mode-changing unit according to a desired focusing mode increases the range of handleable object distances at which an object can be accurately focused. The focusing mode is changeable by operating an operation portion (e.g., an electronic switch) provided on an interchangeable lens system or an imaging apparatus including the optical system OL according to any of the embodiments.

In the optical system OL, according to each of the first and fourth embodiments respectively illustrated in FIGS. 1A-1D and FIGS. 7A-7D, the first lens unit L1 acted upon by the operation portion corresponds to the "mode-changing unit", and the first lens unit L1 and the second lens unit L2 move toward the object side when the mode is changed from the first focusing mode to the second focusing mode.

In the optical system OL, according to each of the second and third embodiments, the first lens unit L1 and the third lens unit L3 together correspond to the mode-changing unit, and the first lens unit L1, the second lens unit L2, and the third lens unit L3 all move toward the object side when the mode is changed from the first focusing mode to the second focusing mode.

In the first focusing mode, priority is put on the size reduction of the optical system OL. Therefore, in the first focusing mode, the lenses are arranged such that the distance between a lens surface at the extreme end on the object side and the image plane IP becomes as short as possible. In changing from the first focusing mode to the second focusing mode, the focusing lens unit and the mode-changing unit are moved toward the object side so as to enable imaging of an object that is at a distance shorter than the shortest distance handleable in the first focusing mode.

By selectively using the first focusing mode and the second focusing mode according to need, a reduction in the length of the optical system OL as a whole in the first focusing mode and imaging of a point at a shorter distance are both realized.

Now, how each of the lens units operates during focusing will be described. In the optical system OL according to each of the first and fourth embodiments, when the focus is changed from a point at infinity to a point at the first finite distance and from a point at the second finite distance to a point at the third finite distance, the second lens unit L2 is moved toward the image side, with the first lens unit L1 being stationary. In the optical system OL according to each of the second and third embodiments, when the focus is changed from a point at infinity to a point at the first finite distance and from a point at the second finite distance to a point at the third finite distance, the second lens unit L2 is moved toward the image side, with the first lens unit L1 and the third lens unit L3 being stationary. Keeping the third lens unit L3 stationary during focusing contributes to the simplification of a mechanism of driving the optical system OL.

In other words, when changing from the first focusing mode to the second focusing mode all lens units move toward the object side (see transition from FIGS. 1B to 1C, FIGS. 3B to 3C, FIGS. 5B to 5C and FIGS. 7B to 7C). However, during focusing only the focusing lens unit moves toward the image side (see focusing in the first mode FIGS. 1A to 1B, FIGS. 3A to 3B, FIGS. 5A to 5B and FIGS. 7A to 7B; and see focusing in the second mode FIGS. 1C to 1D, FIGS. 3C to 3D, FIGS. 5C to 5D and FIGS. 7C to 7D).

In the optical system OL according to each of the embodiments, some of the lenses included in the first lens unit L1 are movable in a direction containing a component that is perpendicular to the optical axis OA, so that the imaging position can be shifted. Thus, image blur is corrected.

The optical system OL according to each of the embodiments satisfies the following conditional expression:

$$2.20 < |1 - \beta f^2| \times \beta r^2 < 9.00 \tag{1}$$

where $\beta f$ denotes the lateral magnification of the focusing lens unit when the focus is on a point at infinity, and $\beta r$ denotes the lateral magnification of a combination of any lenses that are on the image side with respect to the focusing lens unit when the focus is on the point at infinity.

Conditional Expression (1) given above defines a numerical range of focus sensitivity of the optical system OL. The term "focus sensitivity" refers to a parameter indicating the ratio between the length of travel of the focusing lens unit in the optical-axis direction and the length of shift of the imaging position that is caused by the movement of the focusing lens unit. The focus sensitivity is calculated in accordance with Conditional Expression (1).

If the focus sensitivity becomes higher than the upper limit of Conditional Expression (1), the focus tends to fluctuate in correspondence with control errors in the position of the focusing lens unit. If the focus sensitivity becomes higher than the upper limit of Conditional Expression (1) and the lateral magnification $\beta f$ of the focusing lens unit becomes too high, the ranges of variations in aberrations that occur during focusing are widened. If the focus sensitivity becomes lower than the lower limit of Conditional Expression (1) and the lateral magnification $\beta f$ of the focusing lens unit becomes too low, the length of travel of the focusing lens unit during focusing becomes too long, hindering the realization of a quick focusing action.

The above factors are set appropriately in each of the embodiments so that Conditional Expression (1) is satisfied.

Hence, an optical system that exhibits high optical performance in spite of its small body and is suitable for short-range imaging is provided.

In each of the embodiments, a preferable numerical range of Conditional Expression (1) is as follows:

$$2.50 < |1-\beta f^2| \times \beta r^2 < 8.00 \quad (1a)$$

A more preferable numerical range of Conditional Expression (1) is as follows:

$$3.00 < |1-\beta f^2| \times \beta r^2 < 7.50 \quad (1b)$$

In each of the embodiments, at least one of the following conditional expressions may further be satisfied:

$$0.010 < Df/DL < 0.090 \quad (2)$$

$$35.00 < vdfn < 100.00 \quad (3)$$

$$0.65 < |DSP/DL| < 0.95 \quad (4)$$

$$0.20 < BF/f < 1.80 \quad (5)$$

$$-1.70 < ff/f < -0.40 \quad (6)$$

$$0.50 \leq -\beta \quad (7)$$

$$0.01 < |M1/M2| < 0.80 \quad (8)$$

where Df denotes the thickness of the focusing lens unit on the optical axis OA, DL denotes the thickness of the optical system OL on the optical axis OA when the focus is on a point at infinity, vdfn denotes the Abbe number, for d-line, of a material forming a negative lens included in the focusing lens unit, DSP denotes the distance from the aperture stop SP to the image plane IP on the optical axis OA when the focus is on the point at infinity, BF denotes the back focal length of the optical system OL when the focus is on the point at infinity, f denotes the focal length of the optical system OL when the focus is on the point at infinity, ff denotes the focal length of the focusing lens unit, β denotes the lateral magnification of the optical system OL that is in the first focusing mode and is focused on a point at the first finite distance, M1 denotes the length of travel (amount of movement) of the first lens unit L1 that occurs when the mode is changed from the first focusing mode to the second focusing mode, and M2 denotes the length of travel of the focusing lens unit that occurs when the focus is changed from a point at the second finite distance to a point at the third finite distance in the second focusing mode.

The thickness DL of the optical system OL on the optical axis OA corresponds to the distance on the optical axis OA from the lens surface at the extreme end on the object side to the lens surface at the extreme end on the image side in the optical system OL. The back focal length BF is the air-equivalent length of the distance from the lens surface at the extreme end on the image side in the optical system OL to the image plane IP. The length of travel of the lens unit is the difference between the position of the lens unit before being moved and the position of the lens unit after being moved.

The Abbe number vd is expressed as follows:

$$vd = (Nd-1)/(NF-NC)$$

where NF, NC, and Nd denote the refractive indices of the lens material for F-line (at 486.1 nm), C-line (at 656.3 nm), and d-line (at 587.6 nm), respectively.

Conditional Expression (2) defines the ratio of the thickness Df of the focusing lens unit on the optical axis OA to the thickness DL of the optical system OL on the optical axis OA when the focus is on a point at infinity. If the thickness Df of the focusing lens unit on the optical axis OA becomes too large and the ratio becomes higher than the upper limit of Conditional Expression (2), the focusing lens unit becomes too heavy, hindering the realization of a quick focusing action. If the thickness DL of the optical system OL on the optical axis OA becomes too large and the ratio becomes lower than the lower limit of Conditional Expression (2), the total optical length becomes too long, hindering the realization of size reduction of the optical system OL.

Conditional Expression (3) defines the Abbe number vdfn, for d-line, of the material forming the negative lens included in the focusing lens unit.

If the Abbe number vdfn, for d-line, of the material forming the negative lens included in the focusing lens unit becomes larger than the upper limit of Conditional Expression (3), axial chromatic aberration and lateral chromatic aberration are overcorrected, hindering appropriate correction of chromatic aberration. If the Abbe number vdfn, for d-line, of the material forming the negative lens included in the focusing lens unit becomes smaller than the lower limit of Conditional Expression (3), it becomes difficult to suppress the variations in the axial chromatic aberration and in the lateral chromatic aberration that may occur during focusing.

Conditional Expression (4) defines the ratio of the distance DSP from the aperture stop SP to the image plane IP on the optical axis OA when the focus is on a point at infinity to the thickness DL of the optical system OL on the optical axis OA when the focus is on the point at infinity. As noted above, DL corresponds to the distance, on the optical axis OA, from a lens surface at the extreme end on the object side to a lens surface at the extreme end on the image side when the focus of the optical system OL is on a point at infinity. If the distance DSP from the aperture stop SP to the image plane IP on the optical axis OA becomes too long and the ratio becomes higher than the upper limit of Conditional Expression (4), the entrance pupil is shifted toward the object side, increasing the diameter of the focusing lens unit. If the distance DSP from the aperture stop SP to the image plane IP on the optical axis OA becomes too short and the ratio becomes lower than the lower limit of Conditional Expression (4), the distance from the optical axis OA to off-axis rays traveling through the first lens unit L1 when the focus is on a point at a short distance becomes too long. Consequently, the effective diameter of the first lens unit L1 becomes too large.

Conditional Expression (5) defines the ratio of the back focal length BF of the optical system OL when the focus is on a point at infinity to the focal length f of the optical system OL when the focus is on the point at infinity. If the back focal length BF of the optical system OL when the focus is on the point at infinity becomes too long and the ratio becomes higher than the upper limit of Conditional Expression (5), the length of the optical system OL becomes too long, hindering the realization of size reduction of the optical system OL. If the back focal length BF of the optical system OL when the focus is on the point at infinity becomes too short and the ratio becomes lower than the lower limit of Conditional Expression (5), the incident angle of off-axis rays upon the image plane IP becomes too large, making it difficult to suppress the occurrence of shading.

Conditional Expression (6) defines the ratio of the focal length ff of the focusing lens unit to the focal length f of the optical system OL when the focus is on a point at infinity. If the focal length ff of the focusing lens unit becomes too short and the ratio becomes higher than the upper limit of Conditional Expression (6), the refractive power of the focusing lens unit becomes too strong, causing great field curvature on the over side. If the focal length ff of the focusing lens unit becomes too long and the ratio becomes lower than the lower limit of Conditional Expression (6), the refractive power of the focusing lens unit becomes too weak, causing great field curvature on the under side.

Conditional Expression (7) defines the lateral magnification β of the optical system OL that is in the first focusing mode and is focused on a point at the first finite distance. If the lateral magnification β of the optical system OL that is in the first focusing mode and is focused on the point at the first finite distance becomes lower than the lower limit of Conditional Expression (7), short-range imaging becomes difficult to perform.

Conditional Expression (8) defines the ratio of the length of travel M1 of the first lens unit L1 that is observed when the mode is changed from the first focusing mode to the second focusing mode to the length of travel M2 of the focusing lens unit that is observed when the focus is changed from a point at the second finite distance to a point at the third finite distance. If the length of travel M1 of the first lens unit L1 that is observed when the mode is changed from the first focusing mode to the second focusing mode becomes too long and the ratio becomes higher than the upper limit of Conditional Expression (8), great field curvature occurs on the over side. If the length of travel M2 of the focusing lens unit that is observed during focusing in the second focusing mode becomes too long and the ratio becomes lower than the lower limit of Conditional Expression (8), great field curvature occurs on the under side, hindering the realization of a quick focusing action.

Preferable numerical ranges of Conditional Expressions (2) to (8) are as follows:

$$0.012 < Df/DL < 0.070 \quad (2a)$$

$$37.00 < vdfn < 80.00 \quad (3a)$$

$$0.70 < |DSP/DL| < 0.93 \quad (4a)$$

$$0.25 < BF/f < 1.70 \quad (5a)$$

$$-1.65 < ff/f < -0.50 \quad (6a)$$

$$0.70 \le -\beta \quad (7a)$$

$$0.02 < |M1/M2| < 0.60 \quad (8a)$$

More preferable numerical ranges of Conditional Expressions (2) to (8) are as follows:

$$0.015 < Df/DL < 0.060 \quad (2b)$$

$$40.00 < vdfn < 60.00 \quad (3b)$$

$$0.75 < |DSP/DL| < 0.90 \quad (4b)$$

$$0.30 < BF/f < 1.65 \quad (5b)$$

$$-1.60 < ff/f < -0.60 \quad (6b)$$

$$1.00 \le -\beta \quad (7b)$$

$$0.03 < |M1/M2| < 0.50 \quad (8b)$$

Now, configurations of the respective lens units will be described.

In the optical system OL according to each of the first, third, and fourth embodiments, the first lens unit L1 consists of, in order from the object side toward the image side, a negative lens 101, a positive lens 102, a positive lens 103, a negative lens 104, a positive lens 105, a negative lens 106, a positive lens 107, and a positive lens 108. In the optical system OL according to the second embodiment, the first lens unit L1 consists of, in order from the object side toward the image side, a negative lens 101, a positive lens 102, a negative lens 103, a negative lens 104, a positive lens 105, a negative lens 106, a positive lens 107, and a positive lens 108.

In the optical system OL according to each of the embodiments, the second lens unit L2 consists of a cemented lens 109 in which a positive lens and a negative lens provided in that order from the object side toward the image side are cemented together. Since the second lens unit L2 corresponding to the focusing lens unit consists of the positive lens and the negative lens, the variation in chromatism that may occur during focusing is reduced. Furthermore, since the second lens unit L2 corresponding to the focusing lens unit consists of two lenses, the weight of the focusing lens unit is reduced, realizing a quick focusing action.

In the optical system OL according to the second embodiment, the third lens unit L3 consists of one negative lens 110. In the optical system OL according to the third embodiment, the third lens unit L3 consists of one positive lens 110.

Numerical Examples 1 to 4 corresponding to the first to fourth embodiments, respectively, of the present invention will be given below, in which i denotes the ordinal number given to each of the optical surfaces counted from the object side, ri denotes the radius of curvature of an i-th optical surface, di denotes the distance between the i-th surface and an i+1-th surface, and ndi and vdi denote the refractive index and the Abbe number, respectively, of the material forming the i-th optical member for d-line. Aspherical surfaces are denoted by an asterisk (*).

The shape of each aspherical surface that is calculated on the basis of the displacement in the position of that surface in the optical-axis direction at a height h from the optical axis OA with respect to the vertex of that surface is denoted as x and is expressed as follows:

$$x = (h^2/R)/[1+[1-(1+K)(h/R)^2]^{1/2}] + B \times h^4 + C \times h^6 + D \times h^8 + E \times h^{10}$$

where K denotes the conic constant, B, C, D, and E denote aspherical surface coefficients, and R denotes the paraxial radius of curvature. Furthermore, a data value in the form "e-Z" in data on aspherical surfaces given below is equivalent to "$10^{-Z}$."

In each of the embodiments, the back focal length (BF) is the air-equivalent length of the distance from the lens surface at the extreme end on the image side in the optical system OL to the image plane IP. Values of the relevant factors defined above and the results of substituting the values into Conditional Expressions (1) to (8) are summarized for each of Numerical Examples 1 to 4 in Table 1 given below.

[Numerical Example 1]

| Unit: mm | | | | |
|---|---|---|---|---|
| Data on surfaces | | | | |
| Surface No. | r | d | nd | vd |
| 1 | −197.665 | 0.50 | 1.58313 | 59.5 |
| 2* | 8.009 | 3.03 | | |
| 3 | 34.792 | 1.84 | 1.80518 | 25.4 |
| 4 | −34.792 | 2.55 | | |
| 5 | −39.399 | 1.22 | 1.77250 | 49.6 |

-continued

Unit: mm

| | | | | |
|---|---|---|---|---|
| 6 | −24.094 | 1.67 | | |
| 7 | −23.519 | 0.60 | 1.95375 | 32.3 |
| 8 | 82.440 | 0.95 | | |
| 9 | ∞ | 1.90 | | |
| 10 (stop) | ∞ | 0.61 | | |
| 11 | 16.940 | 5.23 | 1.51823 | 58.9 |
| 12 | −16.940 | 2.75 | | |
| 13 | −12.932 | 0.65 | 1.90366 | 31.3 |
| 14 | −143.739 | 0.15 | | |
| 15 | 26.215 | 4.23 | 1.49700 | 81.5 |
| 16 | −18.292 | 0.15 | | |
| 17* | 64.432 | 2.97 | 1.58313 | 59.5 |
| 18* | −17.234 | 0.29 | | |
| 19 | ∞ | (variable) | | |
| 20 | 51.516 | 1.22 | 1.95906 | 17.5 |
| 21 | 332.148 | 0.45 | 1.83481 | 42.7 |
| 22 | 16.990 | (variable) | | |
| 23 | ∞ | 1.00 | 1.51633 | 64.1 |
| 24 | ∞ | 12.28 | | |
| Image plane | ∞ | | | |

Data on aspherical surfaces

2nd surface

K = 0.00000e+000 B = −1.76791e−004 C = −2.65273e−006
D = 7.81442e−009 E = −6.68614e−010

17th surface

K = 0.00000e+000 B = −7.23379e−005 C = −1.23764e−008
D = −2.58452e−009 E = 1.02225e−010

18th surface

K = 0.00000e+000 B = 6.10927e−005 C = 1.30720e−007
D = −2.33941e−009 E = 1.12506e−010

Other data

| | Infinity | 1st finite | 2nd finite | 3rd finite |
|---|---|---|---|---|
| Focal length | 27.74 | 18.14 | 27.76 | 16.95 |
| F-number | 3.61 | 4.12 | 5.95 | 5.80 |
| ½ angle of view | 26.21 | 36.98 | 26.20 | 38.86 |
| Image height | 13.66 | 13.66 | 13.66 | 13.66 |
| Total lens length | 76.47 | 76.47 | 77.06 | 77.06 |
| BF | 42.22 | 34.41 | 42.81 | 33.44 |
| d19 | 0.94 | 8.75 | 0.94 | 10.32 |
| d22 | 29.28 | 21.47 | 29.87 | 20.49 |

Data on lens units

| Unit | Starting surface | Focal length |
|---|---|---|
| 1 | 1 | 12.30 |
| 2 | 20 | −33.23 |

[Numerical Example 2]

Unit: mm

Data on surfaces

| Surface No. | r | d | nd | vd |
|---|---|---|---|---|
| 1 | 70.443 | 0.50 | 1.59201 | 67.0 |
| 2* | 8.169 | 2.54 | | |
| 3 | 24.222 | 2.15 | 1.72825 | 28.5 |
| 4 | −24.222 | 1.08 | | |
| 5 | −20.096 | 0.67 | 1.77250 | 49.6 |
| 6 | −56.978 | 0.39 | | |
| 7 | −143.264 | 0.60 | 1.88300 | 40.8 |
| 8 | 25.796 | 3.17 | | |
| 9 | ∞ | 1.90 | | |
| 10 (stop) | ∞ | 0.60 | | |
| 11 | 15.909 | 5.48 | 1.49700 | 81.5 |

-continued

Unit: mm

| | | | | |
|---|---|---|---|---|
| 12 | −15.909 | 3.21 | | |
| 13 | −10.911 | 0.65 | 1.91082 | 35.3 |
| 14 | 762.731 | 0.15 | | |
| 15 | 25.278 | 4.64 | 1.49700 | 81.5 |
| 16 | −16.379 | 0.15 | | |
| 17* | 36.818 | 3.69 | 1.59201 | 67.0 |
| 18* | −14.928 | −0.35 | | |
| 19 | ∞ | (variable) | | |
| 20 | 58.872 | 2.13 | 1.84666 | 23.8 |
| 21 | −118.425 | 1.20 | 1.77250 | 49.5 |
| 22* | 15.634 | (variable) | | |
| 23 | −19.827 | 2.20 | 1.48749 | 70.2 |
| 24* | −21.419 | (variable) | | |
| Image plane | ∞ | | | |

Data on aspherical surfaces

2nd surface

K = 0.00000e+000 B = −1.25297e−004 C = −1.66834e−006
D = −1.75070e−008 E = 6.34797e−011

17th surface

K = 0.00000e+000 B = −8.05716e−005 C = −9.83620e−008
D = −4.92724e−009 E = 1.64436e−011

18th surface

K = 0.00000e+000 B = 6.86752e−005 C = −2.06549e−008
D = −3.50284e−009 E = 2.41952e−011

22nd surface

K = 0.00000e+000 B = −1.30779e−006 C = 4.02976e−008
D = −9.27977e−010 E = 4.25211e−012

Other data

| | Infinity | 1st finite | 2nd finite | 3rd finite |
|---|---|---|---|---|
| Focal length | 26.86 | 17.61 | 26.86 | 16.39 |
| F-number | 3.61 | 4.02 | 6.54 | 6.06 |
| ½ angle of view | 26.96 | 38.90 | 26.96 | 39.81 |
| Image height | 13.66 | 13.66 | 13.66 | 13.66 |
| Total lens length | 77.00 | 77.00 | 77.30 | 77.30 |
| BF | 12.00 | 12.00 | 12.30 | 12.30 |
| d19 | 1.34 | 7.97 | 1.34 | 9.42 |
| d22 | 26.91 | 20.27 | 26.91 | 18.83 |
| d24 | 12.00 | 12.00 | 12.30 | 12.30 |

Data on lens units

| Unit | Starting surface | Focal length |
|---|---|---|
| 1 | 1 | 11.25 |
| 2 | 20 | −30.22 |
| 3 | 23 | −1000.00 |

[Numerical Example 3]

Unit: mm

Data on surfaces

| Surface No. | r | d | nd | vd |
|---|---|---|---|---|
| 1 | 70.574 | 0.50 | 1.58313 | 59.5 |
| 2* | 9.415 | 3.60 | | |
| 3 | 44.653 | 1.80 | 1.84666 | 23.8 |
| 4 | −44.653 | 3.13 | | |
| 5 | −9.690 | 1.00 | 1.77250 | 49.6 |
| 6 | −9.672 | 0.30 | | |
| 7 | −527.293 | 0.60 | 1.83400 | 37.2 |
| 8 | 24.934 | 6.67 | | |
| 9 | ∞ | 1.90 | | |
| 10 (stop) | ∞ | 1.43 | | |
| 11 | 18.294 | 4.87 | 1.49700 | 81.5 |

-continued

Unit: mm

| | | | | |
|---|---|---|---|---|
| 12 | −18.294 | 2.82 | | |
| 13 | −13.196 | 0.65 | 1.91082 | 35.3 |
| 14 | 266.505 | 0.15 | | |
| 15 | 28.120 | 4.54 | 1.49700 | 81.5 |
| 16 | −17.762 | 0.15 | | |
| 17* | 25.437 | 4.83 | 1.59201 | 67.0 |
| 18* | −18.308 | −0.26 | | |
| 19 | ∞ | (variable) | | |
| 20 | 74.011 | 1.39 | 2.10420 | 17.0 |
| 21 | −98.534 | 0.40 | 1.85135 | 40.1 |
| 22* | 12.832 | (variable) | | |
| 23 | −19.041 | 2.80 | 1.48749 | 70.2 |
| 24 | −17.213 | (variable) | | |
| Image plane | ∞ | | | |

Data on aspherical surfaces

2nd surface

K = 0.00000e+000 B = −5.86062e−005 C = 1.79931e−007
D = −2.65838e−008 E = 3.72478e−010

17th surface

K = 0.00000e+000 B = −5.66043e−005 C = 7.56951e−009
D = −2.54878e−009 E = 3.04982e−011

18th surface

K = 0.00000e+000 B = 8.23502e−005 C = −1.27811e−007
D = −1.13965e−009 E = 3.33358e−011

22nd surface

K = 0.00000e+000 B = −2.20684e−006 C = −3.39497e−009
D = −8.55126e−010 E = 6.21437e−012

Other data

| | Infinity | 1st finite | 2nd finite | 3rd finite |
|---|---|---|---|---|
| Focal length | 27.61 | 19.11 | 27.61 | 18.42 |
| F-number | 3.61 | 4.05 | 7.45 | 7.09 |
| ½ angle of view | 26.32 | 35.56 | 26.32 | 36.56 |
| Image height | 13.66 | 13.66 | 13.66 | 13.66 |
| Total lens length | 82.50 | 82.50 | 84.19 | 84.19 |
| BF | 9.00 | 9.00 | 10.70 | 10.70 |
| d19 | 1.25 | 5.29 | 1.25 | 5.77 |
| d22 | 28.97 | 24.93 | 28.97 | 24.45 |
| d24 | 9.00 | 9.00 | 10.70 | 10.70 |

Data on lens units

| Unit | Starting surface | Focal length |
|---|---|---|
| 1 | 1 | 9.51 |
| 2 | 20 | −20.84 |
| 3 | 23 | 244.79 |

[Numerical Example 4]

Unit: mm

Data on surfaces

| Surface No. | r | d | nd | vd |
|---|---|---|---|---|
| 1 | −131.170 | 0.50 | 1.58313 | 59.5 |
| 2* | 8.645 | 3.63 | | |
| 3 | 34.909 | 1.75 | 1.80518 | 25.4 |
| 4 | −34.909 | 1.70 | | |
| 5 | −65.410 | 1.21 | 1.77250 | 49.6 |
| 6 | −31.388 | 1.88 | | |
| 7 | −23.367 | 0.60 | 1.95375 | 32.3 |
| 8 | 59.083 | 1.15 | | |
| 9 | ∞ | 1.90 | | |
| 10 (stop) | ∞ | 0.60 | | |
| 11 | 17.916 | 4.95 | 1.51823 | 58.9 |
| 12 | −17.916 | 4.23 | | |
| 13 | −11.175 | 0.65 | 1.90366 | 31.3 |
| 14 | −81.207 | 0.15 | | |
| 15 | 31.223 | 4.27 | 1.49700 | 81.5 |
| 16 | −16.433 | 0.15 | | |
| 17* | 84.231 | 3.25 | 1.58313 | 59.5 |
| 18* | −15.207 | −1.02 | | |
| 19 | ∞ | (variable) | | |
| 20 | 41.213 | 1.21 | 1.95906 | 17.5 |
| 21 | 95.318 | 0.45 | 1.83481 | 42.7 |
| 22 | 17.685 | (variable) | | |
| 23 | ∞ | 1.00 | 1.51633 | 64.1 |
| 24 | ∞ | 12.36 | | |
| Image plane | ∞ | | | |

Data on aspherical surfaces

2nd surface

K = 0.00000e+000 B = −1.52175e−004 C = −1.89541e−006
D = 1.14333e−008 E = −4.65721e−010

17th surface

K = 0.00000e+000 B = −8.52137e−005 C = 8.37789e−008
D = −5.94189e−009 E = 3.11259e−011

18th surface

K = 0.00000e+000 B = 3.99446e−005 C = 2.34884e−008
D = −4.55913e−009 E = 2.93729e−011

Other data

| | Infinity | 1st finite | 2nd finite | 3rd finite |
|---|---|---|---|---|
| Focal length | 26.74 | 17.08 | 26.75 | 16.61 |
| F-number | 3.60 | 4.06 | 5.89 | 5.54 |
| ½ angle of view | 27.06 | 38.65 | 27.06 | 38.49 |
| Image height | 13.66 | 13.66 | 13.66 | 13.66 |
| Total lens length | 78.98 | 78.98 | 79.57 | 79.57 |
| BF | 43.32 | 33.14 | 43.91 | 31.55 |
| d19 | 2.11 | 12.29 | 2.11 | 14.47 |
| d22 | 30.30 | 20.12 | 30.89 | 18.53 |

Data on lens units

| Unit | Starting surface | Focal length |
|---|---|---|
| 1 | 1 | 13.16 |
| 2 | 20 | −41.18 |

TABLE 1

| Factor | 1st embodiment | 2nd embodiment | 3rd embodiment | 4th embodiment |
|---|---|---|---|---|
| βf | 2.23 | 2.28 | 2.87 | 2.03 |
| βr | 1.00 | 1.05 | 1.01 | 1.00 |
| Df | 1.67 | 3.33 | 1.79 | 1.66 |
| DL | 76.47 | 77.00 | 82.50 | 78.98 |
| DSP | 62.21 | 64.00 | 63.00 | 66.56 |
| νdfn | 42.73 | 49.47 | 40.10 | 42.73 |
| f | 27.74 | 26.86 | 27.61 | 26.74 |
| ff | −33.23 | −30.22 | −20.84 | −41.18 |
| BF | 42.22 | 12.00 | 9.00 | 43.32 |
| M1 | 0.59 | 0.30 | 1.69 | 0.59 |
| M2 | 9.38 | 8.08 | 4.52 | 12.36 |
| β | −1.00 | −1.00 | −1.00 | −1.00 |
| Conditional Expression | | | | |
| (1) | 3.97 | 4.60 | 7.40 | 3.12 |
| (2) | 0.022 | 0.043 | 0.022 | 0.021 |
| (3) | 42.73 | 49.47 | 40.10 | 42.73 |

TABLE 1-continued

|     | 1st embodiment | 2nd embodiment | 3rd embodiment | 4th embodiment |
|-----|----------------|----------------|----------------|----------------|
| (4) | 0.81           | 0.83           | 0.76           | 0.84           |
| (5) | 1.52           | 0.45           | 0.33           | 1.63           |
| (6) | −1.20          | −1.12          | −0.75          | −1.54          |
| (7) | 1.00           | 1.00           | 1.00           | 1.00           |
| (8) | 0.06           | 0.04           | 0.37           | 0.05           |

A digital still camera (an imaging apparatus) including the optical system OL according to any of the above embodiments of the present invention as an imaging optical system will now be described with reference to FIG. 9. The digital still camera illustrated in FIG. 9 includes a camera body 10, an imaging optical system 11 corresponding to the optical system OL according to any of the first to fourth embodiments, and a solid-state imaging device 12 (a photoelectric conversion device) such as a CCD sensor or a CMOS sensor. The solid-state imaging device 12 is provided in the camera body 10 and receives an optical object image that is formed by the imaging optical system 11.

Applying the optical system OL according to any of the above embodiments of the present invention to an imaging apparatus such as a digital still camera as described above provides an imaging apparatus that is suitable for short-range imaging and exhibits high optical performance in spite of its small body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-089582, filed Apr. 24, 2015, which is hereby incorporated by reference herein in its entirety.

What is claimed is:

1. An optical system comprising, in order from an object side toward an image side:
    a first lens unit having positive refractive power and configured to be stationary during focusing; and
    a second lens unit having negative refractive power and configured to move in a first focusing mode for focusing within a range of object distances from infinity to a first finite distance and in a second focusing mode for focusing within a range of object distances from a second finite distance that is shorter than infinity to a third finite distance that is shorter than the first finite distance,
    wherein the first lens unit and the second lens unit move toward the object side when a focusing mode is changed from the first focusing mode to the second focusing mode,
    wherein the optical system satisfies the following conditional expression:

$2.20 < |1-\beta f^2| \times \beta r^2 < 9.00$ where $\beta f$ denotes lateral magnification of the second lens unit when focusing on a point at infinity, and $\beta r$ denotes lateral magnification of a combination of any lenses that are on an image side with respect to the second lens unit when focusing on the point at infinity.

2. The optical system according to claim 1, wherein the optical system satisfies the following conditional expression:

$0.010 < Df/DL < 0.090$ where Df denotes thickness of the second lens unit on an optical axis, and DL denotes thickness of the optical system on the optical axis when focusing on the point at infinity.

3. The optical system according to claim 1, wherein the second lens unit includes a negative lens, and wherein the optical system satisfies the following conditional expression:

$35.00 < vdfn < 100.00$ where vdfn denotes Abbe number, for d-line, of a material forming the negative lens included in the second lens unit.

4. The optical system according to claim 1, further comprising:
    an aperture stop,
    wherein the optical system satisfies the following conditional expression:

$0.65 < |DSP/DL| < 0.95$ where DSP denotes a distance from the aperture stop to an image plane on an optical axis when focusing on the point at infinity, and DL denotes a thickness of the optical system on the optical axis when focusing on the point at infinity.

5. The optical system according to claim 1, wherein the optical system satisfies the following conditional expression:

$0.20 < BF/f < 1.80$ where BF denotes back focal length of the optical system when focusing on the point at infinity, and f denotes focal length of the optical system when focusing on the point at infinity.

6. The optical system according to claim 1, wherein the optical system satisfies the following conditional expression:

$-1.70 < ff/f < -0.40$ where ff denotes focal length of the second lens unit, and f denotes focal length of the optical system when focusing on the point at infinity.

7. The optical system according to claim 1, wherein the optical system satisfies the following conditional expression:

$0.50 \le -\beta$ where $\beta$ denotes lateral magnification of the optical system that is in the first focusing mode and is focused on a point at the first finite distance.

8. The optical system according to claim 1, consisting of, in order from an object side toward an image side: the first lens unit and the second lens unit.

9. The optical system according to claim 1, consisting of, in order from an object side toward an image side:
    the first lens unit;
    the second lens unit; and
    a third lens unit having positive refractive power and configured to be stationary during focusing,
    wherein the third lens unit moves toward the object side when the focusing mode is changed from the first focusing mode to the second focusing mode.

10. The optical system according to claim 1, consisting of, in order from an object side toward an image side:
    the first lens unit;
    the second lens unit; and
    a third lens unit having negative refractive power and configured to be stationary during focusing, wherein the third lens unit moves toward the object side when the focusing mode is changed from the first focusing mode to the second focusing mode.

11. The optical system according to claim 8, wherein the optical system satisfies the following conditional expression:

$$0.01 < |M1/M2| < 0.80$$

where M1 denotes a movement amount of the first lens unit that is observed when the focusing mode is changed from the first focusing mode to the second focusing mode, and M2 denotes a movement amount of the second lens unit that is observed when the focus is changed from a point at the second finite distance to a point at the third finite distance.

12. The optical system according to claim 9, wherein the optical system satisfies the following conditional expression:

$$0.01 < |M1/M2| < 0.80$$

where M1 denotes a movement amount of the first lens unit when the focusing mode is changed from the first focusing mode to the second focusing mode, and M2 denotes a movement amount of the second lens unit when the focus is changed from a point at the second finite distance to a point at the third finite distance.

13. The optical system according to claim 10, wherein the optical system satisfies the following conditional expression:

$$0.01 < |M1/M2| < 0.80$$

where M1 denotes a movement amount of the first lens unit when the focusing mode is changed from the first focusing mode to the second focusing mode, and M2 denotes a movement amount of the second lens unit when the focus is changed from a point at the second finite distance to a point at the third finite distance.

14. An imaging apparatus comprising:
an optical system; and
an imaging device configured to receive an image formed by the optical system,
wherein the optical system comprises, in order from an object side toward an image side:
  a first lens unit having positive refractive power and configured to be stationary during focusing; and
  a second lens unit having negative refractive power and configured to move in a first focusing mode for focusing within a range of object distances from infinity to a first finite distance and in a second focusing mode for focusing within a range of object distances from a second finite distance that is shorter than infinity to a third finite distance that is shorter than the first finite distance,
wherein the first lens unit and the second lens unit move toward the object side when a focusing mode is changed from the first focusing mode to the second focusing mode,
wherein the optical system satisfies the following conditional expression:

$$2.20 < |1 - \beta f^2| \times \beta r^2 < 9.00$$

where βf denotes lateral magnification of the second lens unit when focusing on a point at infinity, and βr denotes lateral magnification of a combination of any lenses that are on an image side with respect to the second lens unit when focusing on the point at infinity.

* * * * *